(12) United States Patent
Ogawa

(10) Patent No.: US 6,368,681 B1
(45) Date of Patent: Apr. 9, 2002

(54) LIQUID CRYSTAL ALIGNMENT FILM, METHOD OF MANUFACTURING THE FILM, LIQUID CRYSTAL DISPLAY USING THE FILM AND METHOD, AND METHOD OF MANUFACTURING THE LIQUID CRYSTAL DISPLAY

(75) Inventor: Kazufumi Ogawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/029,870

(22) PCT Filed: Jul. 7, 1997

(86) PCT No.: PCT/JP97/02354

§ 371 Date: Mar. 4, 1998

§ 102(e) Date: Mar. 4, 1998

(87) PCT Pub. No.: WO98/01789

PCT Pub. Date: Jan. 15, 1998

(30) Foreign Application Priority Data

| Jul. 10, 1996 | (JP) | ................................ 8-180327 |
| Jul. 30, 1996 | (JP) | ................................ 8-200170 |
| Aug. 26, 1996 | (JP) | ................................ 8-224219 |
| Sep. 26, 1996 | (JP) | ................................ 8-254729 |

(51) Int. Cl.[7] .............................................. C09K 19/52
(52) U.S. Cl. ..................................... 428/1.23; 349/124
(58) Field of Search ......................... 428/1.1, 1.2, 1.23, 428/447, 448; 349/123, 124, 127, 131; 252/299.4, 299.01

(56) References Cited

U.S. PATENT DOCUMENTS

| 5,133,895 A | 7/1992 | Ogawa et al. ............ 252/299.4 |
| 5,186,986 A | 2/1993 | Ogawa ............................ 428/1 |
| 5,515,190 A | 5/1996 | Ogawa et al. ................. 359/75 |
| 5,578,351 A | 11/1996 | Shashidhar et al. ............ 428/1 |
| 5,604,615 A | 2/1997 | Iwagoe et al. ............... 349/124 |
| 5,686,019 A | 11/1997 | Nakamura ............. 252/299.01 |

FOREIGN PATENT DOCUMENTS

| EP | 0 476 543 | 3/1992 |
| EP | 0 684 500 | 11/1995 |
| EP | 0 123 456 | 2/2000 |
| JP | 2-3015 | 1/1990 |
| JP | 2-269318 | 11/1990 |
| JP | 02-289826 A | 11/1990 |
| JP | 3-282547 | 12/1991 |
| JP | 4-190328 | 7/1992 |
| JP | 4-353827 | 12/1992 |
| JP | 04-356020 A | 12/1992 |
| JP | 5-232473 | 9/1993 |
| JP | 5-273558 | 10/1993 |
| JP | 6-34976 | 2/1994 |
| JP | 6-138640 | 5/1994 |
| JP | 6-222366 | 8/1994 |
| JP | 07-072484 A | 3/1995 |
| JP | 7-114029 | 5/1995 |
| JP | 7-281420 | 10/1995 |

*Primary Examiner*—Alexander S. Thomas
*Assistant Examiner*—Sow-Fun Hon
(74) *Attorney, Agent, or Firm*—Merchant & Gould PC

(57) ABSTRACT

A positive resist mainly composed of a novolak resin and comprising a naphthoquinone diazido-based photosensitizer as an energy beam sensitive resin (e.g., a photosensitive resin) is applied in a thickness of 0.1 to 0.2 μm to a surface of a glass substrate 1 provided with transparent electrodes and dried so as to form a photosensitive film. Next, using a mask, the film is exposed to ultraviolet rays (365 nm). Then, moisture in the air reacts with the resist in an exposed portion 2', thereby generating —COOH groups, with which $CH_3(CH_2)_{18}SiCl_3$ is allowed to react so as to cause a dehydrochlorination reaction, thereby forming a monomolecular chemisorption film 6 comprising carbon chains 8. This film is used as an alignment film. Thus, the present invention provides a method for producing a uniform and thin alignment film for use in a liquid crystal display panel with a high efficiency without performing a rubbing treatment, and a method for producing a display panel using the same.

6 Claims, 28 Drawing Sheets

(a)

(b)

(c)

(d)

LIQUID CRYSTAL ALIGNMENT FILM, METHOD OF MANUFACTURING THE FILM, LIQUID CRYSTAL DISPLAY USING THE FILM AND METHOD, AND METHOD OF MANUFACTURING THE LIQUID CRYSTAL DISPLAY

TECHNICAL FIELD

The present invention relates to an image display apparatus employing liquid crystal and a method for producing such an image display apparatus. More specifically, the present invention relates to a liquid crystal alignment film used for a flat display panel employing liquid crystal for displaying images on television (TV) and computers or the like, and a method for producing such a liquid crystal alignment film, and also relates to a liquid crystal display apparatus employing the same and a method for producing such a liquid crystal display apparatus.

BACKGROUND ART

Conventionally, an apparatus used as a color liquid crystal display panel generally includes liquid crystal that is injected between two substrates provided with counter electrodes arranged in a matrix via a liquid crystal alignment film formed by rotary-coating a polyvinyl alcohol or a polyimide solution with a spinner or the like.

For example, the following device was proposed. Thin film transistor (TDF) arrays having pixel electrodes are formed on a first glass substrate beforehand. A plurality of color filters of red, blue and green are formed on a second glass substrate, and common transparent electrodes are further formed thereon. The surfaces provided with the respective electrodes are coated with a polyvinyl alcohol or a polyimide solution with a spinner so as to form films. Then, rubbing is performed so as to form liquid crystal alignment films, and the substrates are opposed and attached to each other via spacers with an arbitrary gap. Thereafter, liquid crystal (twist nematic (TN) or the like) is injected therebetween so as to form a panel structure. Then, polarizing plates are provided on the front and the back of the panel. While the panel is irradiated with back light from the back side, TFTs are operated. In this manner color images are displayed.

However, in the conventional method for producing an alignment film, polyvinyl alcohol or polyimide is dissolved in an organic solvent and the resultant solution is applied by rotary-coating or the like. Then, rubbing is performed with a felt cloth or the like. Therefore, there is a serious problem in that uniformity in the alignment film is poor in surface step portions or for a large area panel (such as a 14 inch display). Moreover, since rubbing is performed, defects are generated in the TFTs, and debris generated by rubbing causes defects in display.

DISCLOSURE OF INVENTION

The present invention was carried out in order to solve the above-mentioned conventional problems, and thus has the object of providing a method for forming an alignment film used in a liquid crystal display panel highly efficiently, uniformly and thinly without performing a rubbing treatment as conventionally performed, and providing a method for producing a display panel employing the same.

A first liquid crystal alignment film of the present invention for achieving the object is characterized in that a silane-based surfactant having linear carbon chains and Si is chemically adsorbed via a resin film sensitive to energy beams for generating functional groups containing active hydrogen by energy beam irradiation formed on a predetermined surface of a substrate, and that the linear carbon chains are aligned in a specific direction.

In the above-mentioned liquid crystal alignment film, a film formed of the surfactant is preferably fixed to an energy beam sensitive resin film via covalent bonds on the surface of the substrate in a striped pattern. Thus, a liquid crystal alignment film having excellent uniaxial alignment can be obtained.

In the above-mentioned liquid crystal alignment film, the fixed film formed of the surfactant is preferably fixed to the energy beam sensitive resin film via a film having siloxane bonds. This is advantageous because peeling resistance, namely adhesiveness is improved.

In the above-mentioned liquid crystal alignment film, the silane-based surfactant is preferably a chlorosilane-based surfactant containing a linear hydrocarbon group and a chlorosilyl group. As the silane-based surfactant, a substance comprising a chlorosilyl group (SiCl), an alkoxysilyl group (SiOA, A represents an alkyl group), or an isocyanate silyl group (SiNCO) at the terminal of the molecule can be used. Above all, when a chlorosilane-based surfactant is used, an alignment film covalently bonded to the substrate via siloxane bonds can be produced easily and efficiently.

In the above-mentioned liquid crystal alignment film, a part of the hydrogen of the linear hydrocarbon group of the chlorosilane-based surfactant is preferably substituted with at least a fluorine atom. This is advantageous because the critical surface energy as the alignment film can be reduced, thereby improving a response performance of liquid crystal.

In the above-mentioned liquid crystal alignment film, a plurality of chlorosilane-based surfactants each having a different molecular length are preferably mixed and used as the chlorosilane-based surfactant containing a linear hydrocarbon group and a chlorosilyl group. Thus, a film having concavities and convexities on the molecular level on its surface can be formed, thus obtaining a liquid crystal alignment film with which the alignment angle (pre-tilt angle) of liquid crystal can be controlled on the molecular level.

A second liquid crystal alignment film of the present invention is a monomolecular film formed on a surface of a substrate provided with desired electrodes. The molecules constituting the film have a desired tilt, and are bonded and fixed to the surface of the substrate at one end while being aligned uniformly in a specific direction.

In the above-mentioned liquid crystal alignment film, the desired tilt of the molecules is preferably formed by fixing the molecules constituting the film to the substrate by covalent bonds, washing the molecules with an organic solvent, and tilting the substrate in a desired direction so as to drain off the solvent.

In the above-mentioned liquid crystal alignment film, the molecules constituting the film preferably contain carbon chains or siloxane bond chains. This is advantageous because the alignment property of the film can be improved.

In the above-mentioned liquid crystal alignment film, a carbon of a part of the carbon chain preferably has an optical activity. This is advantageous because the alignment property of the film can be improved by irradiation of light.

In the above-mentioned liquid crystal alignment film, the molecules constituting the film preferably have Si at both ends. This is advantageous because the film can be bonded to the substrate firmly.

In the above-mentioned liquid crystal alignment film, the molecules constituting the film are preferably formed by mixing a plurality of types of chemisorption molecules each having a different molecular length, and the fixed film preferably has concavities and convexities on the molecular length level. This is advantageous because the tilt angle of liquid crystal can be controlled.

A third liquid crystal alignment film of the present invention is a monomolecular film formed on a surface of a substrate provided with desired electrodes. The molecules constituting the film have carbon chains or siloxane bond chains, and at least a part of the carbon chain or the siloxane bond chain contains at least a functional group for controlling a surface energy of the film. The production of such a liquid crystal alignment film can provide an alignment film that has functions of controlling the critical surface energy of the alignment film and thus controlling the pre-tilt angle of injected liquid crystal, and aligning the liquid crystal in an arbitrary direction, without performing conventional rubbing.

In the above-mentioned liquid crystal alignment film, a plurality of types of silane-based surfactants each having a different critical surface energy are preferably mixed and used as the molecules constituting the film, so as to control the fixed film to have a desired critical surface energy value. This is advantageous because the pre-tilt angle can be controlled.

In the above-mentioned liquid crystal alignment film, the functional group for controlling the surface energy is at least one organic group selected from the group consisting of a carbon trifluoride group (—$CF_3$), a methyl group (—$CH_3$), a vinyl group (—CH=$CH_2$,), an allyl group (—CH=CH—), an acetylene group (triple bonds of carbon—carbon), a phenyl group (—$C_6H_5$), an aryl group (—$C_6H_4$—), a halogen atom, an alkoxy group (—OR; R represents an alkyl group, preferably an alkyl group having one to three carbons), a cyano group (—CN), an amino group (—$NH_2$), a hydroxyl group (—OH), a carbonyl group (=CO), an ester group (—COO—) and a carboxyl group (—COOH). This makes it easy to control the critical surface energy.

In the above-mentioned liquid crystal alignment film, the molecules constituting the film preferably contain Si at the terminals. This makes it very easy to fix the molecules to the surface of the substrate.

In the above-mentioned liquid crystal alignment film, the critical surface energy of the film is preferably controlled to be a desired value between 15 mN/m to 56 mN/m. This makes it possible to control the pre-tilt angle of injected liquid crystal to be any angle in the range from 0 to 90 degrees.

A fourth liquid crystal alignment film of the present invention is characterized in that a resin film transparent in the visible light range and having energy beam sensitive groups and thermoreactive groups is formed directly on electrodes or indirectly via an arbitrary thin film, and at least the energy beam sensitive groups are reacted and crosslinked.

In the above-mentioned liquid crystal alignment film, the energy beam sensitive groups and the thermoreactive groups are preferably introduced as side chain groups in the resin film.

In the above-mentioned liquid crystal alignment film, the energy beam sensitive groups, the thermoreactive groups and hydrocarbon groups are preferably introduced as side chain groups in the resin film.

In the above-mentioned liquid crystal alignment film, the surface of the resin film preferably has striped concavities and convexities.

In the above-mentioned liquid crystal alignment film, the thermoreactive groups are preferably reacted and crosslinked.

In the above-mentioned liquid crystal alignment film, a substance represented by (formula 1) is preferably used as the resin film. (formula 1)

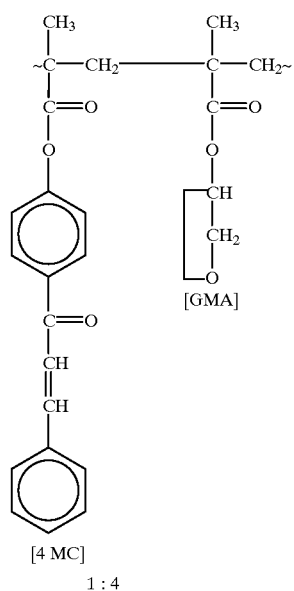

1 : 4

Next, a method for producing the first liquid crystal alignment film of the present invention includes the steps of applying and forming an energy beam sensitive resin film for generating functional groups containing active hydrogen by energy beams directly or indirectly via an arbitrary thin film on a predetermined surface of a substrate provided with electrodes, irradiating the surface of the resin film with energy beams in an arbitrary pattern, contacting the irradiated resin film with a chemisorption solution containing a silane-based surfactant having linear carbon chains and Si groups, washing the substrate with a solvent incapable of dissolving the resin film, thereby forming one layer of a monomolecular film formed of the surfactant selectively in the irradiated portion, and aligning and fixing the linear carbon chains in the surfactant molecules.

In the above-mentioned method, the energy beams are preferably at least one selected from the group consisting of electron beams, X rays and light with a wavelength of 100 nm to 1 $\mu$m. Above all, it is especially preferable to use ultraviolet rays.

In the above-mentioned method, the chemisorption solution preferably contains at least a chlorosilane-based surfactant comprising a linear carbon chain and a chlorosilyl group and a solvent that causes no damage to the energy beam sensitive resin film. This is advantageous because the underlying photosensitive thin film cannot be injured.

In the above-mentioned method, the energy beams are preferably at least one light selected from the group consisting of ultraviolet rays, visible rays and infrared rays, and the energy beam sensitive resin film is preferably a photosensitive resin film. This makes it very easy to produce the liquid crystal alignment film.

In the above-mentioned method, the photosensitive resin film is preferably a polymer film or a monomer film containing at least one organic group selected from the group consisting of a group represented by (formula 2), a group represented by (formula 3) and a group represented by (formula 4). The use of these polymers is advantageous because ultraviolet rays can be used as the energy beams.

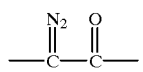
(formula 2)

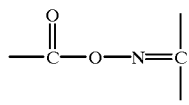
(formula 3)

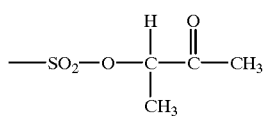
(formula 4)

Furthermore, when a specific liquid crystal, for example nematic liquid crystal or ferroelectric liquid crystal, is incorporated by bonding to a surfactant to be adsorbed, an alignment film having an excellent alignment controllability can be obtained.

In the above-mentioned method, a solvent including a carbon fluoride group is preferably used as a nonaqueous solvent. This is advantageous because the underlying photosensitive substrate cannot be injured A method for producing the second liquid crystal alignment film of the present invention is a method for producing a monomolecular liquid crystal alignment film including the steps of contacting a substrate provided with electrodes with a chemisorption solution so as to cause a chemical reaction between molecules of a surfactant in the adsorption solution and a surface of the substrate, thereby bonding and fixing the surfactant molecules to the surface of the substrate at one end, washing the substrate with an organic solvent, and tilting the substrate in a desired direction so as to drain off the solvent, thereby aligning the fixed molecules in the direction in which the solvent was drained off.

Preferably, the above-mentioned method further includes the step of exposing the substrate to light polarized in a desired direction via a polarizing plate after the step of aligning the fixed molecules, so as to align the orientations of the surfactant molecules uniformly in a specific direction at a desired tilt.

In the above-mentioned method, a silane-based surfactant containing linear hydrocarbon groups or siloxane bond chains and chlorosilyl groups, alkoxysilyl groups or isocyanate silyl groups is preferably used as the surfactant. This makes it possible to produce a monomolecular liquid crystal alignment film efficiently.

In the above-mentioned method, a plurality of types of silane-based surfactants each having a different molecular length are mixed and used as the silane-based surfactant containing linear hydrocarbon groups or siloxane bond chains and chorosilyl groups, alkoxysilyl groups or isocyanate silyl groups. This is advantageous because the alignment angle of the adsorbed and fixed molecules, i.e., the pre-tilt angle of injected liquid crystal can be controlled.

In the above-mentioned method, a carbon of a part of the hydrocarbon group preferably has an optical activity. This is advantageous because alignment can be controlled efficiently at the time of realignment by irradiation of light.

In the above-mentioned method, the hydrocarbon group or the siloxane bond chain preferably contains a halogen atom or a methyl group (—CH), a phenyl group (—$C_6H_5$), a cyano group (—CN), a hydroxyl group (—OH), a carboxyl group (—COOH), an amino group (—$NH_2$), or a carbon trifluoride group (—$CF_3$) at the terminal. This makes it possible to control the surface energy of the film.

In the above-mentioned method, the light that is used for exposure is preferably light having at least one wavelength selected from the group consisting of 436 nm, 405 nm, 365 nm, 254 nm and 248 nm. Any light can be used as the light for exposure, as long as the light has a wavelength that can be absorbed by the film. However, the light having the above-mentioned wavelength is advantageous because it can be absorbed by most films.

In the above-mentioned method, a silane-based surfactant containing linear hydrocarbon groups or siloxane bond chains and chlorosilyl groups or isocyanate silyl groups is preferably used as the surfactant, and a nonaqueous organic solvent containing no water is preferably used as the washing organic solvent. The use of these is advantageous in removing unreacted molecules of the surfactant completely. At this time, when a photosensitive reactive group such as a vinyl group (>C=C<), an acetylene bond group (a triple bond group of carbon—carbon) or the like is incorporated into the linear hydrocarbon group or the siloxane bond chain, and the photosensitive group is allowed to react with light so as to be crosslinked or polymerized at the time of alignment with light, the heat resistance of the obtained monomolecular film can be improved.

In the above-mentioned method, a solvent containing an alkyl group, a carbon fluoride group, a carbon chloride group or a siloxane group is preferably used as the nonaqueous organic solvent. The use of this solvent makes dehydration easy and thus provides a high efficiency.

In the above-mentioned method, it is preferable to form a film containing a large number of SiO groups before the step of fixing the surfactant molecules at one end, and then form a monomolecular film via this film. This makes it possible to obtain a film whose quality is ensured.

A method for producing the third liquid crystal alignment film of the present invention includes the steps of contacting a substrate provided with electrodes with a chemisorption solution produced by using a silane-based surfactant containing carbon chains or siloxane bond chains, at least a part of the carbon chain or the siloxane bond chain containing at least one functional group for controlling a surface energy of a formed film, thereby causing a chemical reaction between the surfactant molecules in the adsorption solution and the surface of the substrate so as to bond and fix the surfactant molecules to the surface of the substrate at one end.

In the above-mentioned method, a silane-based surfactant containing linear carbon chains or siloxane bond chains and chlorosilyl groups, alkoxysilyl groups or isocyanate silyl groups is preferably used as the surfactant.

In the above-mentioned method, a plurality of types of silane-based surfactants each having a different critical surface energy are preferably mixed and used as the surfactant. This makes it possible to control the critical surface energy of the film more precisely.

In the above-mentioned method, at least one organic group selected from the group consisting of a carbon trifluoride group (—$CF_3$), a methyl group (—$CH_3$), a vinyl group (—CH=$CH_2$), an allyl group (—CH=CH—), an acetylene group (triple bonds of carbon—carbon), a phenyl group (—$C_6H_5$), an aryl group (—$C_6H_4$—), a halogen atom, an alkoxy group (—OR; R represents an alkyl group, preferably an alkyl group having one to three carbons), a cyano group (—CN), an amino group (—$NH_2$), a hydroxyl group (—OH), a carbonyl group (=CO), an ester group (—COO—) and a carboxyl group (—COOH) is preferably incorporated into the carbon chain or the siloxane bond chain at its terminal, principal chain or side chain. This also makes it possible to control the critical surface energy of the film more precisely.

Preferably, the above-mentioned method further includes the steps of washing the substrate with an organic solvent after the step of bonding and fixing the surfactant molecules to the surface of the substrate at one end, and tilting the substrate in a desired direction so as to drain off the solvent, thereby aligning the fixed molecules in the direction in which the solvent was drained off. This makes it possible to control the tilt angle of injected liquid crystal.

Preferably, the above-mentioned method further includes the step of exposing the substrate to light through a polarizing film after the step of aligning the molecules, so as to realign the molecules in a desired direction. This makes it possible to improve alignment performance.

In the above-mentioned method, a silane-based surfactant containing linear carbon chains or siloxane bond chains and chlorosilyl groups or isocyanate silyl groups is preferably used as the surfactant, and a nonaqueous organic solvent containing no water is preferably used as the washing organic solvent. This makes it possible to provide a monomolecular liquid crystal alignment film having fewer defects.

At this time, it is advantageous in draining off a solvent to use a solvent containing an alkyl group, a carbon fluoride group, a carbon chloride group or a siloxane group as the nonaqueous organic solvent.

In the above-mentioned method, it is preferable to perform the step of forming a film containing a large number of SiO groups before the step of fixing the surfactant molecules at one end, and then form a monomolecular liquid crystal film via this film. This makes it possible to provide a monomolecular alignment film having a higher density.

A method for producing the fourth liquid crystal alignment film of the present invention includes the steps of applying and forming a resin film transparent in a visible light range and having energy beam sensitive groups and thermoreactive groups on a predetermined surface of a substrate provided with electrodes directly or indirectly via an arbitrary thin film, and at least irradiating the resin film with energy beams through an arbitrary mask so as to react and crosslink the energy beam sensitive groups.

In the above-mentioned method, the step of reacting and crosslinking the thermoreactive groups by heating is preferably added before or after the step of reacting and crosslinking the energy beam sensitive groups.

In the above-mentioned method, the energy beam sensitive groups are preferably photosensitive groups, and the resin film is preferably irradiated with ultraviolet rays through a mask so that the photosensitive groups in the resin film react not only to crosslink between principal chains but also to align and fix side chain groups.

In the above-mentioned method, a polarizing film or a diffraction grating is preferably used as the mask for exposure.

In the above-mentioned method, in the step of exposure, the resin film is preferably exposed to light to an extent that concavities and convexities are generated on the surface thereof.

Next, a first liquid crystal display apparatus of the present invention includes a pair of substrates, electrodes and alignment films, the electrodes being formed on surfaces of substrates, the alignment films being formed thereon, liquid crystal being interposed between the counter electrodes on the two substrates via the alignment films. At least one alignment film is a film in which a silane-based surfactant having a linear carbon chain is chemically adsorbed via an energy beam sensitive film for generating a functional group containing active hydrogen by irradiation of energy beams, and the linear carbon chains are aligned in a specific direction.

A second liquid crystal display apparatus of the present invention has a structure where a film is formed as an alignment film for liquid crystal directly on the surface provided with electrodes on at least one substrate of two substrates provided with counter electrodes or indirectly via another film. The film is a monomolecular film formed of a silane-based surfactant having linear carbon chains or siloxane bond chains, and the molecules constituting the film have a desired tilt and are bonded and fixed to the surface of the substrate at one end while being aligned uniformly in a specific direction. Liquid crystal is interposed between the counter electrodes on the two substrates via the alignment film.

In the above-mentioned liquid crystal display apparatus, the film is preferably formed on each of the surfaces of the two substrates provided with the counter electrodes as the alignment film. This is advantageous in improving an alignment regulation force on the injected liquid crystal.

In the above-mentioned liquid crystal display apparatus, the film on the surface of the substrate preferably comprises a plurality of patterned sections each having a different alignment direction. This makes it possible to provide a liquid crystal display apparatus having multi-domain alignment easily.

The above-mentioned liquid crystal display apparatus is preferably used in an IPS system (an inplane switch system or a lateral driving system) where the counter electrodes are formed on a surface of one substrate. This is advantageous because the viewing angle can be significantly improved.

A third liquid crystal display apparatus of the present invention has a structure where a film is formed as an alignment film for liquid crystal directly on the surface provided with electrodes on at least one substrate of the two substrates provided with counter electrodes or indirectly via another film. The film is constituted by molecules containing carbon chains or siloxane bond chains, a part of the carbon chain or the siloxane bond chain containing at least one functional group for controlling a surface energy of the film. liquid crystal is interposed between the counter electrodes on the two substrates via the alignment film. This makes it possible to provide a liquid crystal display apparatus in which the critical surface energy of the alignment film is controlled, the pre-tilt angle of the injected liquid crystal is controlled, and the liquid crystal is aligned in an arbitrary direction, without performing conventional rubbing.

In the above-mentioned liquid crystal display apparatus, when the film is formed on each of the surfaces of the two substrates provided with the counter electrodes as the alignment film, it is possible to provide a liquid crystal display apparatus having a higher contrast.

In the above-mentioned liquid crystal display apparatus, it is advantageous to form a plurality of patterned sections each having a different alignment direction in the film on the surface of the substrate, because the display viewing angle can be significantly improved.

The above-mentioned liquid crystal display apparatus can be used as a display device of an inplane switch (IPS) type where the counter electrodes are formed on a surface of one substrate.

A fourth liquid crystal display apparatus of the present invention has a structure where a resin film transparent in a visible light range and having energy beam sensitive groups and thermoreactive groups is formed directly on electrodes or indirectly via an arbitrary thin film, and at least the energy beam sensitive groups are reacted and crosslinked. The thus obtained liquid crystal alignment film is formed on electrodes on at least one substrate of counter electrodes. Liquid crystal is interposed between the counter electrodes on the two substrates via the resin film.

Next, a method for producing a first liquid crystal display apparatus of the present invention includes the steps of applying and forming an energy beam sensitive resin film for generating functional groups containing active hydrogen by energy beams directly or indirectly via an arbitrary thin film on a first substrate including first electrode arrays arranged in a matrix beforehand, irradiating the surface of the resin film with energy beams in an arbitrary pattern, contacting the substrate with the irradiated resin film with a chemisorption solution containing a silane-based surfactant having linear carbon chains and Si, washing the substrate with a solvent incapable of dissolving the resin film, thereby forming one layer of a monomolecular film formed of the surfactant selectively in the irradiated portion, and aligning and fixing the linear carbon chains, attaching the first substrate including the first electrode arrays to a second substrate including second electrodes or electrode arrays so that the respective electrodes are countered with a predetermined gap, and injecting predetermined liquid crystal between the first substrate and the second substrate.

A method for producing a second liquid crystal display apparatus includes the steps of contacting a first substrate including first electrode arrays arranged in a matrix beforehand with a chemisorption solution directly or after forming an arbitrary thin film so as to cause a chemical reaction between the surfactant molecules in the adsorption solution and the surface of the substrate, thereby bonding and fixing the surfactant molecules to the surface of the substrate at one end, washing the substrate with an organic solvent, tilting the substrate in a desired direction so as to drain the solvent off the substrate, thereby aligning the fixed molecules in the direction in which the solvent is drained off, exposing the substrate to light polarized in a desired direction via a polarizing plate so as to align the orientations of the surfactant molecules uniformly in a specific direction at a desired tilt, attaching the first substrate including the first electrodes to a second substrate or a second substrate including second electrodes or electrode arrays so that the faces provided with the electrodes are facing inward with a predetermined gap, and injecting predetermined liquid crystal between the first substrate and the second substrate.

In the above-mentioned method, in the step of exposing the substrate to light polarized in a desired direction via a polarizing plate so as to align the orientations of the bonded surfactant molecules uniformly in a specific direction at a desired tilt, it is preferable to repeat the step of exposure with a patterned mask disposed on the polarizing plate several times, because this can provide a liquid crystal display apparatus having so-called multi-domain alignment where a plurality of patterned sections each having a different alignment direction are formed on one face of the alignment film.

A method for producing a third liquid crystal display apparatus of the present invention includes the steps of contacting a first substrate including first electrodes arranged in a matrix beforehand with a chemisorption solution directly or after forming an arbitrary thin film, the chemisorption solution being produced by using a silane-based surfactant containing carbon chains or siloxane bond chains, at least a part of the carbon chain or the siloxane bond chain containing at least one functional group for controlling a surface energy of a formed film, so as to cause a chemical reaction between the surfactant molecules in the adsorption solution and the surface of the substrate, thereby bonding and fixing the surfactant molecules to the surface of the substrate at one end, washing the substrate with an organic solvent, tilting the substrate in a desired direction so as to drain the solvent off the substrate, thereby aligning the fixed molecules in the direction in which the solvent is drained off, attaching the first substrate including the first electrode arrays to a second substrate or a second substrate including second electrodes or electrode arrays so that the faces provided with the electrodes are facing inward with a predetermined gap, and injecting predetermined liquid crystal between the first substrate and the second substrate. This method makes it possible to produce a liquid crystal display apparatus efficiently.

In the above-mentioned method, it is preferable to perform the further step of exposing the substrate to light polarized in a desired direction via a polarizing plate so as to align the orientations of the surfactant molecules uniformly in a specific direction at a desired tilt after the step of aligning the fixed molecules. This makes it possible to realize a liquid crystal display apparatus having excellent alignment characteristics.

In the above-mentioned method, in the step of exposing the substrate to light polarized in a desired direction via a polarizing plate so as to align the orientations of the bonded surfactant molecules uniformly in a specific direction at a desired tilt, it is preferable to repeat the step of exposure with a patterned mask disposed on the polarizing plate several times so as to form a plurality of patterned sections each having a different alignment direction on one face of the alignment film, because this can provide a liquid crystal display apparatus having multi-domain alignment.

A method for producing a fourth liquid crystal display apparatus of the present invention includes the steps of applying and forming a resin film transparent in a visible light range and having energy beam sensitive groups and thermoreactive groups directly or indirectly via an arbitrary thin film on a first substrate including first electrode arrays arranged in a matrix, at least irradiating the resin film with energy beams through an arbitrary mask so as to react and crosslink the energy beam sensitive groups, attaching the first substrate including the first electrode arrays to a second substrate including second electrodes or electrode arrays opposed to the first electrode arrays so that the respective faces provided with the electrodes are opposed to each other, and injecting predetermined liquid crystal between the first substrate and the second substrate.

BEST MODE FOR CARRYING OUT THE INVENTION

Figure 1:
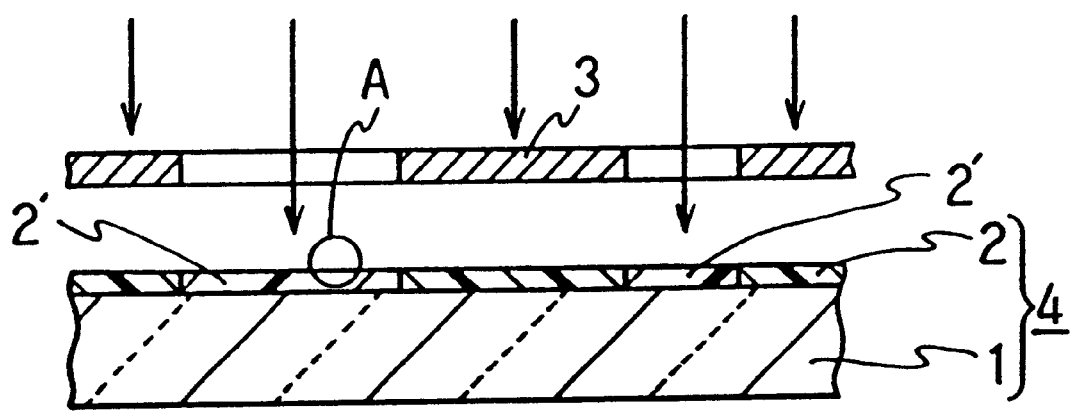
FIG. 1 is a schematic cross-sectional view for illustrating an exposure process in producing a liquid crystal alignment film in Example 1 of the present invention.

A first liquid crystal alignment film of one embodiment of the present invention is produced by a method comprising the steps of applying and forming an energy beam sensitive resin film for generating functional groups containing active hydrogen by energy beams directly or indirectly via an arbitrary thin film on a predetermined portion on a surface of a substrate provided with electrodes, irradiating the surface of the resin film with energy beams in an arbitrary pattern, contacting the irradiated resin film with a chemisorption solution containing a silane-based surfactant having linear carbon chains and Si groups, washing the resin film with a solvent incapable of dissolving the resin film, thereby forming one layer of a monomolecular film formed of the surfactant selectively in the irradiated portion, and aligning and fixing the linear carbon chains in the surfactant molecules.

Furthermore, a first liquid crystal display apparatus of one embodiment of the present invention is produced by a method comprising the steps of applying and forming an energy beam sensitive resin film for generating functional groups containing active hydrogen by energy beams directly or indirectly via an arbitrary thin film on a first substrate including first electrodes arranged in a matrix beforehand, irradiating the surface of the resin film with energy beams in an arbitrary pattern, contacting the substrate with the irradiated resin film with a chemisorption solution containing a silane-based surfactant having linear carbon chains and Si, washing the substrate with a solvent incapable of dissolving the resin film, thereby forming one layer of a monomolecular film formed of the surfactant selectively in the irradiated portion, and aligning and fixing the linear carbon chains, attaching the first substrate including the first electrodes to a second substrate including second electrodes or electrode arrays so that the respective electrodes are opposed with a predetermined gap, and injecting predetermined liquid crystal between the first substrate and the second substrate.

A second liquid crystal alignment film of one embodiment of the present invention is produced by a method comprising at least the steps of contacting a substrate provided with electrodes with a chemisorption solution so as to cause a chemical reaction between the surfactant molecules in the adsorption solution and the surface of the substrate, thereby bonding and fixing the surfactant molecules to the surface of the substrate at one end, washing the substrate with an organic solvent, tilting the substrate in a desired direction so as to drain off the solvent, thereby firstly aligning the fixed molecules in the direction in which the solvent is drained off, and exposing the substrate to light polarized in a desired direction via a polarizing plate so as to align the orientations of the surfactant molecules uniformly in a specific direction at a desired tilt.

Furthermore, a second liquid crystal display apparatus of one embodiment of the present invention is produced by a method comprising at least the steps of contacting a first substrate including first electrodes arranged in a matrix beforehand with a chemisorption solution directly or after forming an arbitrary thin film so as to cause a chemical reaction between the surfactant molecules in the adsorption solution and the surface of the substrate, thereby bonding and fixing the surfactant molecules to the surface of the substrate at one end, washing the substrate with an organic solvent, tilting the substrate in a desired direction so as to drain the solvent off the substrate, thereby aligning the fixed molecules in the direction in which the solvent is drained off, exposing the substrate to light polarized in a desired direction via a polarizing plate so as to align the orientations of the surfactant molecules uniformly in a specific direction at a desired tilt, attaching the first substrate including the first electrode arrays to a second substrate or a second substrate including second electrodes or electrode arrays so that the faces provided with the electrodes are facing inward with a predetermined gap, and injecting predetermined liquid crystal between the first substrate and the second substrate.

A third liquid crystal alignment film of one embodiment of the present invention is produced by a method comprising at least the steps of contacting a substrate provided with electrodes with a chemisorption solution produced by using a silane-based surfactant containing carbon chains or siloxane bond chains, at least a part of the carbon chain or the siloxane bond chain containing at least one functional group for controlling a surface energy of a formed film, thereby causing a chemical reaction between the surfactant molecules in the adsorption solution and the surface of the substrate so as to bond and fix the surfactant molecules to the surface of the substrate at one end.

Furthermore, a third liquid crystal display apparatus of one embodiment of the present invention is produced by a method comprising at least the steps of contacting a first substrate including first electrode arrays arranged in a matrix beforehand with a chemisorption solution directly or after forming an arbitrary thin film, the chemisorption solution being produced by using a silane-based surfactant containing a carbon chain or a siloxane bond chain, at least a part of the carbon chain or the siloxane bond chain containing at least one functional group for controlling a surface energy of a formed film, so as to cause a chemical reaction between the surfactant molecules in the adsorption solution and the surface of the substrate, thereby bonding and fixing the surfactant molecules to the surface of the substrate at one end, washing the substrate with an organic solvent, tilting the substrate in a desired direction so as to drain off the solvent, thereby aligning the fixed molecules in the direction in which the solvent is drained off, attaching the first substrate including the first electrode arrays to a second substrate or a second substrate including second electrodes or electrode arrays so that the faces provided with the electrodes are facing inward with a predetermined gap, and injecting predetermined liquid crystal between the first substrate and the second substrate.

A fourth liquid crystal alignment film of one embodiment of the present invention will be generally described below.

First, a resin film transparent in a visible light range and having energy beam sensitive groups and thermoreactive groups is applied and formed on a predetermined surface of a substrate provided with electrodes directly or indirectly via an arbitrary thin film. Next, the substrate with the resin film is irradiated with energy beams through an arbitrary mask so as to react and crosslink the energy beam sensitive groups.

At this time, if the energy beam sensitive groups are photosensitive groups, and the step of irradiating the film with light through a mask so as to react the photosensitive groups in the film not only to crosslink between principal chains but also to align and fix side chain groups is included, rubbing is not required as performed conventionally and an ordinary exposure apparatus can be used, thus simplifying the production process of the liquid crystal alignment film.

Furthermore, when the resin film was irradiated with light through a polarizing film or a diffraction grating as a mask, a liquid crystal alignment film having striped convexities and concavities was produced efficiently.

At this time, when exposure was performed obliquely through a polarizing film or a diffraction grating, or exposure is performed through a polarizing film and then exposure is performed obliquely through a diffraction grating, or exposure is performed through a diffraction grating and then exposure is performed obliquely through a polarizing film, a liquid crystal alignment film capable of controlling the pre-tilt angle of the interposed liquid crystal as well was produced. In the process of exposure via the diffraction grating, it was important to expose the photosensitive film to light to an extent that convexities and concavities are generated on the surface thereof in order to stabilize the alignment.

Furthermore, when heat is applied so as to react the thermoreactive groups before or after radiating energy beams so as to crosslink the energy beam sensitive groups, the heat resistance of the alignment of the liquid crystal was improved. Electron beams, X rays, or ultraviolet rays are usable as the energy beams, but ultraviolet rays provided higher practicability.

It is highly advantageous in producing a liquid crystal alignment film to use a substance represented by (formula 1) as the resin transparent in a visible light range and having energy beam sensitive groups and thermoreactive groups, because the substance has a high ultraviolet ray sensitivity, and a thermal crosslinking reaction also can be utilized.

In formula 1, energy beam sensitive benzalacetophenone groups and thermoreactive glycidyl groups are introduced as side chain groups, and hydrocarbon groups (—CH$_3$) are further introduced as side chain groups. Therefore, compared with substances containing no hydrocarbon groups as side chain groups, the substance represented by (formula 1) provided an improved alignment stability. Furthermore, in this case, it was important to expose the transparent resin film to light to an extent that convexities and concavities in the range from 1 to 100 nm were generated on the surface thereof, in order to improve the alignment stability of the liquid crystal.

By using the above-mentioned methods, a resin film transparent in a visible light range and having energy beam sensitive groups and thermoreactive groups was formed directly on electrodes or indirectly via an arbitrary thin film, and a rubbing-free liquid crystal alignment film formed of a film obtained at least by reacting the energy beam sensitive groups was produced by a remarkably simple method.

The fourth liquid crystal display apparatus of one embodiment of the present invention was produced by a method comprising the steps of applying and forming a resin film transparent in a visible light range and having energy beam sensitive groups and thermoreactive groups directly or indirectly via an arbitrary thin film on a first substrate including first electrodes arranged in a matrix beforehand, at least irradiating the resin film with energy beams through an arbitrary mask so as to react and crosslink the energy beam sensitive groups, attaching the first substrate including the first electrodes to a second substrate including second electrodes or electrode arrays opposed to the first electrode arrays so that the respective faces provided with the electrodes are opposed to each other, and injecting predetermined liquid crystal between the first substrate and the second substrate. By the above-mentioned method, a resin film transparent in a visible light range and having energy beam sensitive groups and thermoreactive groups was formed, and the film was at least irradiated with energy beams through an arbitrary mask so as to react and crosslink the energy beam sensitive groups. The thus obtained film was formed on electrodes on at least one substrate of the counter electrodes on the two substrates as an alignment film for liquid crystal. Thus, a liquid crystal display apparatus having a structure in which liquid crystal is interposed between the counter electrodes on the two substrates via the film was produced with remarkably high efficiency.

The present invention will be specifically described by way of examples. (Example 1)

First, as shown in FIG. 1, an energy beam sensitive resin (a photosensitive resin in this example) was applied onto a surface of a glass substrate 1 provided with transparent electrodes. In this example, a positive resist mainly composed of a novolak resin and comprising a naphthoquinone diazido-based photosensitizer containing the group represented by (formula 2) (e.g., OFPR800 or OFPR5000 manufactured by Tokyo Ohka Kogyo Co., Ltd. or AZ1400 or AZ5200 manufactured by SHIPLEY, or a monomolecular film formed of monomers containing naphthoquinone diazido groups can be used) was used as the energy beam sensitive resin. The resin was applied to a thickness of 0.1 to 0.2 μm and dried so as to form a photosensitive film 2. Next, using a mask 3 having a desired pattern, the film was exposed to ultraviolet rays (365 nm) at about 100 mJ/cm$^2$. Then, moisture in the air and the resist reacted and the reaction represented by (formula 5) below proceeded in an exposed portion 2'.

(formula 5)

Since the —COOH group generated by the exposure contains active hydrogen, condensation (a dehydrochlorination reaction) was effected in combination with —SiCl groups.

Figure 2:
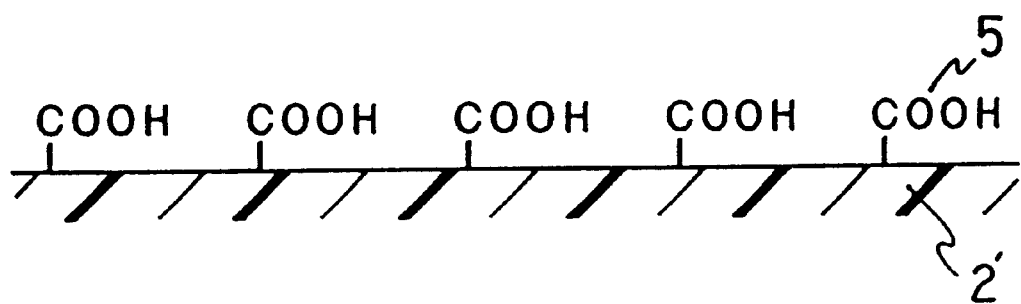
FIG. 2 is a schematic view of portion A in FIG. 1 enlarged to a molecular level showing a —COOH group portion formed on a surface of a substrate by exposure.

Then, by using CH$_3$(CH$_2$)$_{18}$SiCl$_3$ as a silane-based surfactant containing linear hydrocarbon groups and Si (hereinafter, referred to as a chemisorption compound) and dissolving it in a nonaqueous solvent at a concentration of about 1 wt %, a chemisorption solution was prepared. As the nonaqueous solvent, Afulude (manufactured by Asahi Glass Co., Ltd., a fluorine-based solvent) solution was used. Since this solvent is inactive with respect to a positive resist, it does not injure the resist film even if the resist film is in contact with the solvent. The thus prepared solution was used as an adsorption solution, and the exposed substrate 4 was immersed in the adsorption solution in a dry atmosphere (a relative humidity of 30% or less) for 5 minutes. Thereafter, the substrate was lifted from the solution, and washed with a fluorine based nonaqueous solvent (e.g., Fluorinert PF5080 (3M product name)) (since this solvent is also inactive with respect to a positive resist, it does not injure the resist film even if the resist film is in contact with the solvent.) Then, the exposed portion on the surface of the substrate contains a large number of —COOH (carboxyl groups) 5 (FIG. 2, which is an enlarged view of portion A of FIG. 1), so that a dehydrochlorination reaction was effected between the SiCl groups of the substance containing hydrocarbon groups and chlorosilyl groups and the carboxyl groups, thereby generating bonds represented by (formula 6) below selectively in the exposed portion. The line breadth and the pitch were 0.3 μm.

(formula 6)

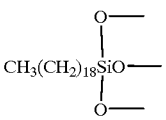

Figure 3:
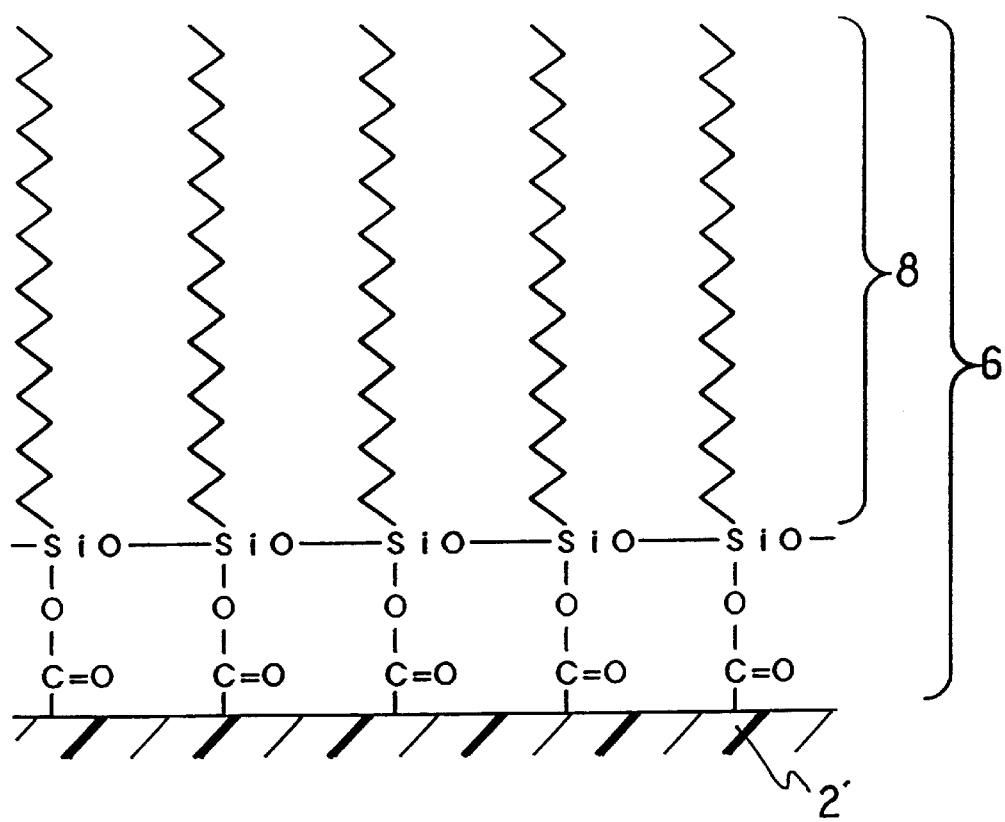
FIG. 3 is a schematic view of portion A in FIG. 1 enlarged to a molecular level showing a lipophilic surface portion in which a chemisorption film is formed.

In the above-described treatment, a monomolecular chemisorption film 6 containing hydrocarbon was formed in a thickness of about 25 Å (2.5 nm) selectively in the exposed portion by being chemically bonded via siloxane covalent bonds, and the treated portion became lipophilic. At this time, the linear carbon chains in the chemisorption film were aligned substantially perpendicular to the substrate (FIG. 3, which is an enlarged view of portion A of FIG. 1). The critical surface energy of the chemisorption film was 20 mN/m.

Figure 4:
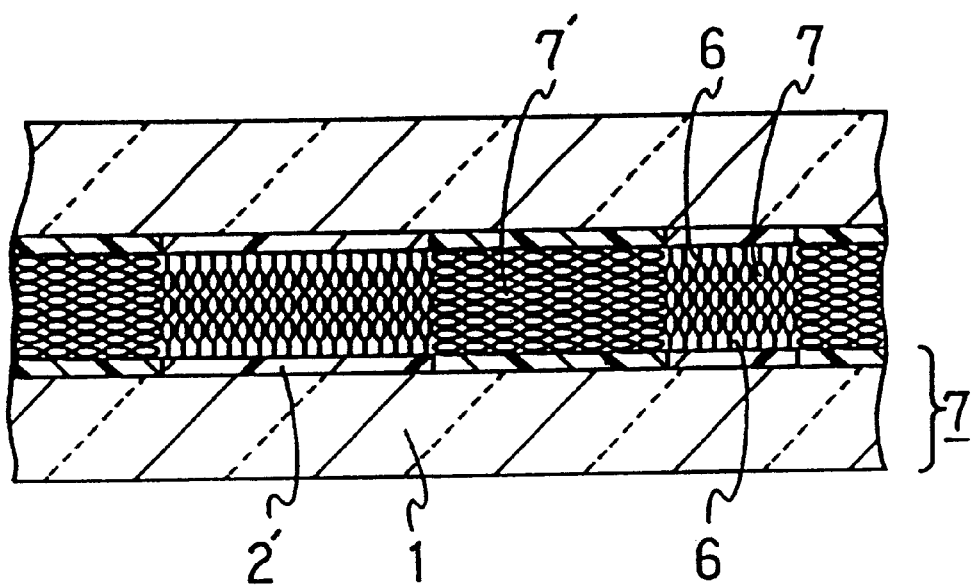
FIG. 4 is a schematic cross-sectional view showing the orientation state of liquid crystals in a liquid crystal cell produced by using a liquid crystal alignment film produced in Example 1 of the present invention.

Then, two substrates in this state were set in such a manner that the chemisorption films were facing each other, so as to assemble a liquid crystal cell having a 20 micron gap. Thereafter, nematic liquid crystal ZLI4792 manufactured by Merck & Co., Inc.) was injected. When the orientation state was observed, it was confirmed that the injected liquid crystal molecules were aligned along the chemically adsorbed molecules and substantially perpendicular to the substrate. In other words, this monomolecular film exhibited a perpendicular alignment function for liquid crystal. At this time, since no monomolecular film was formed in an unexposed portion, liquid crystal was aligned not uniformly but at random. More specifically, when the substrate provided with such an alignment film was in contact with liquid crystal, as shown in FIG. 4, the liquid crystal molecules 7 were partially inserted in the gaps of long carbon chains 8 of the monomolecular adsorption film. Thus, the orientation of the liquid crystal was controlled as a whole. On the other hand, since such an alignment regulation force was not present in the portion provided with no monomolecular film, namely the unexposed portion, the liquid crystal molecules 7' were not aligned uniformly.

In place of the surfactant that is a chemisorption compound, a plurality of silane-based surfactants mixed in a predetermined ratio (e.g., two surfactants each having a different length of a linear carbon chain) were mixed so as to cause chemisorption at the same time. In this case, voids on the molecular level were generated in the monomolecular film, and the liquid crystal molecules were aligned along the voids. Therefore, it was confirmed that the orientation angle of the liquid crystal was controlled by changing the composition. More specifically, when a silane-based surfactant having an arbitrary substituent at a part of its linear long carbon chain and a trichlorosilyl group at the other end was mixed with a silane-based surfactant having an arbitrary substituent at a part of its short carbon chain and a trichlorosilyl group at the other end at a predetermined ratio so as to cause adsorption, it was possible to change the orientation characteristics.

Furthermore, when a silane-based surfactant containing polymeric groups, bonded to liquid crystal molecules similar to the liquid crystal to be incorporated, in a part of substituent (e.g., nematic liquid crystal portion) was mixed with a silane-based surfactant containing short carbon chains and polymeric groups at a predetermined ratio, so as to cause adsorption and polymerization, an alignment film having excellent orientation characteristics especially with respect to specific liquid crystal to be injected was obtained. In particular, in the case where those molecules similar to the molecules of the liquid crystal be injected were of ferroelectric liquid crystal, when a silane-based surfactant having a ferroelectric liquid crystal portion was mixed with a silane-based surfactant having short carbon chains at a predetermined ratio so as to cause adsorption, a monomolecular adsorption and alignment film having an excellent response rate was formed. As the ferroelectric liquid crystal, azomethine-based, azoxy-based or ester-based liquid crystal was usable.

A material for chemisorption is not limited to the silane-based surfactant shown in Example 1, but any material can be used as long as it contains groups having a bonding property with respect to —OH groups (e.g., chlorosilyl groups, isocyanate silyl groups, alkoxysilyl groups or the like).

For example, even when a silane surfactant $CF_3$—$(CH_2)_m$—$C=C$—$(CH_2)_n$—$SiCl_3$ (m: an integer of 0 to 8; n: an integer, most preferably of about 10 to 25) or $CF_3$—$(CF_2)_p$—$(CH_2)_m$—$C=C$—$(CH_2)_n$—$SiCl_3$ (p: an integer of 0 to 7; m: an integer of 0 to 4; and n: an integer of 1 to 8) containing F (fluorine) at a part of the linear hydrocarbon chain was used, a monomolecular adsorption film having an alignment function was produced. In the case where $CF_3$—$(CH_2)_m$—$C=C$—$(CH_2)_n$—$SiCl_3$ was used, the critical surface energy of the chemisorption film was 15 mN/m. In the case where $CF_3$—$(CF_2)_p$—$(CH_2)_m$—$C=C$—$(CH_2)_n$—$SiCl_3$ was used, the critical surface energy of the chemisorption film was 8 mN/m. Thus, especially when F atoms were introduced, the surface energy of the alignment film became small, and the response characteristic of liquid crystal was improved. The critical surface energy in the portion (on the surface of the resin) provided with no chemisorption film (monomolecular film) was 25 mN/m.

Any other resist (polymer films) or surfactant (monomer films) than the novolak resist containing naphthoquinone diazido can be used, as long as it has functional groups that generate active hydrogen by irradiation of a variety of energy beams.

For example, the monomer or the polymer represented by (formula 7) below containing (formula 3), or the monomer or the polymer represented by (formula 8) below containing (formula 4) can be used.

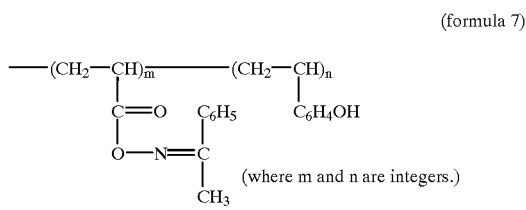

(formula 7)

(where m and n are integers.)

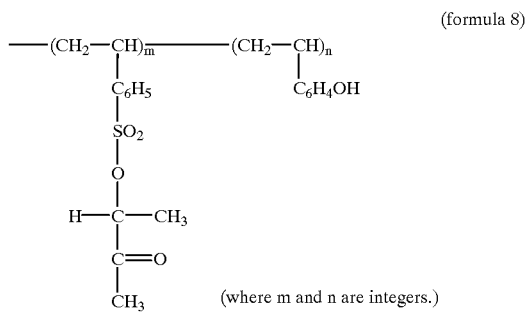

(formula 8)

(where m and n are integers.)

Herein, a decarboxylation reaction proceeds in the group represented by (formula 3) with ultraviolet rays, and a reaction with moisture in the air is effected, so that amino groups containing active hydrogen are generated, as shown in (formula 9) below.

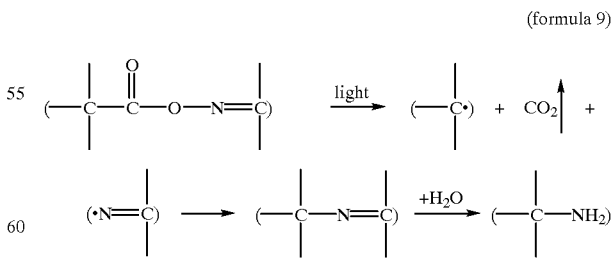

(formula 9)

On the other hand, the group represented by (formula 4) is degraded by ultraviolet rays, and sulfonic groups containing active hydrogen are generated, as shown in (formula 10) below.

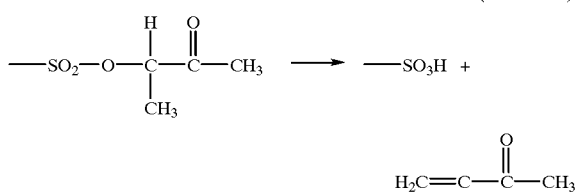

(formula 10)

In the above example, $CH_3(CH_2)_{18}SiCl_3$ was used as the hydrocarbon based surfactant. However, other compounds as shown below were usable.

$CH_3(CH_2)_nSiCl_3$ (n is an integer, preferably of 7 to 24)

$CH_3(CH_2)_pSi(CH_3)_2(CH_2)_qSiCl_3$ (p and q are integers, preferably of 0 to 10)

$CH_3COO(CH_2)_mSiCl_3$ (m is an integer, preferably of 7 to 24)

Furthermore, in place of the hydrocarbon based surfactant, a carbon fluoride-based surfactant, such as $CF_3(CF_2)_7(CH_2)_2SiCl_3$, $CF_3CH_2O(CH_2)_{15}SiCl_3$, $CF_3(CH_2)_2Si(CH_3)_2(CH_2)_{15}SiCl_3$, $F(CF_2)_4(CH_2)_2Si(CH_3)_2(CH_2)_9SiCl_3$, $F(CF_2)_8(CH_2)_2Si(CH_3)_2(CH_2)_9SiCl_3$, $CF_3COO(CH_2)_{15}SiCl_3$, $CF_3(CF_2)_5(CH_2)_2SiCl_3$ or the like, was usable.

EXAMPLE 1-2

The same experiment as Example 1 was performed, except that $CH_3(CH_2)_{14}SiCl_3$ and $NC(CH_2)_{14}SiCl_3$, which contain a linear hydrocarbon group comprising one functional group for controlling the surface energy of a film at the terminal and Si, were used as the silane-based surfactant after the exposure of the entire face (they were mixed at a mole ratio of 1:1).

As a result of the reaction with the chlorosilane-based surfactant, a monomolecular chemisorption film was formed selectively in the portion on the surface of the substrate where hydroxyl groups have been generated by exposure. This monomolecular film was chemically bonded thereto via siloxane bonds in a thickness of about 1.5 nm. The critical surface energy of the chemisorption film was about 27 mN/m.

Furthermore, two substrates in this state were used so as to be set so that the chemisorption films were facing each other. Thus, a liquid crystal cell having a 20 micron gap was assembled so that an anti-parallel orientation was obtained, and then nematic liquid crystal (ZLI4792 manufactured by Merck & Co., Inc.) was injected. When observing the orientation state in the portion where the monomolecular film was formed, the injected liquid crystal molecules were aligned substantially along the chemically adsorbed molecules at a pre-tilt angle of 65° with respect to the substrate in the direction opposite to the direction in which the substrate had been lifted from the washing solution (hereinafter, referred to as a lifting direction).

At this time, when the composition of $CH_3(CH_2)_{14}SiCl_3$ and $NC(CH_2)_{14}SiCl_3$ was changed in the range of 1:0 to 0:1 preferably 10:1 to 1:50), the critical surface energy was changed from 20 mN/m to 29 mN/m, and the pre-tilt angle was able to be controlled arbitrarily in the range from 90° to 40°. Furthermore, when a surfactant containing fluorine as a chemisorption compound such as $CF_3(CF_2)_5(CH_2)_2SiCl_3$ was added, the critical surface energy was reduced to 15 mN/m.

EXAMPLE 2

Figure 5:
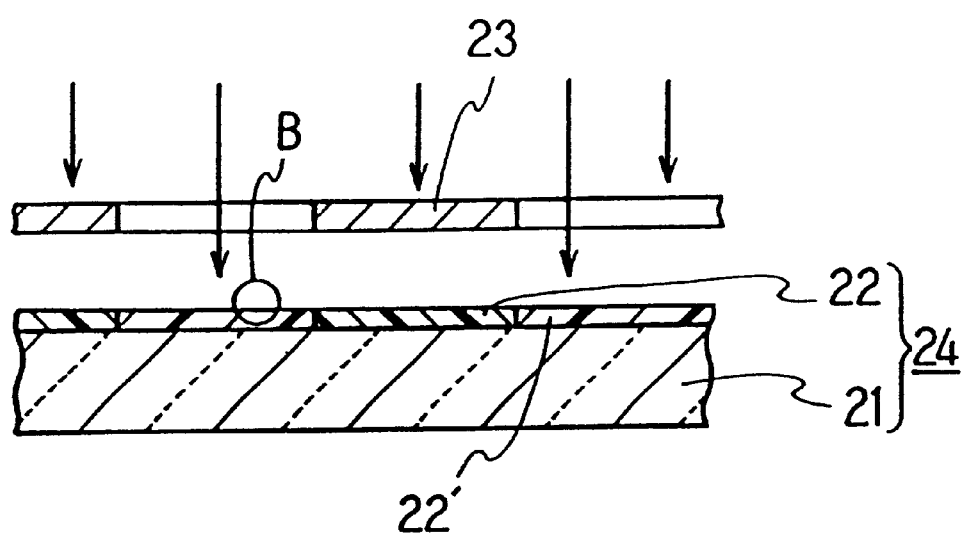
FIG. 5 is a schematic cross-sectional view for illustrating an exposure process in producing a liquid crystal alignment film in Example 2 of the present invention.
Figure 6:
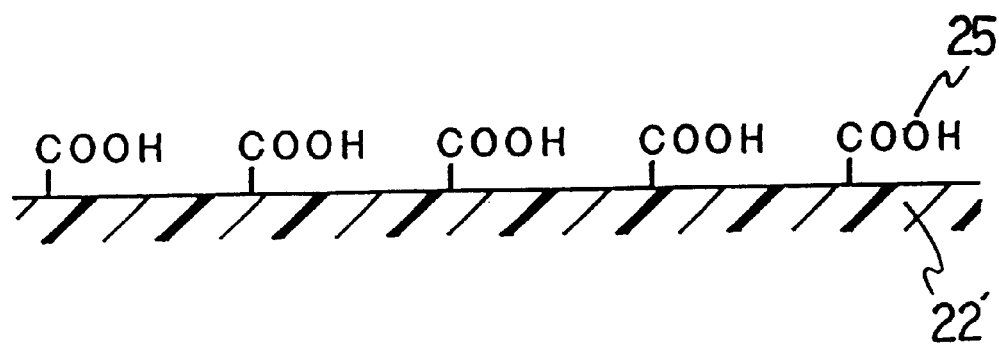
FIG. 6 is a schematic view of portion B in FIG. 5 enlarged to a molecular level showing a —COOH group portion formed on a surface of a substrate by exposure.

First, a positive resist 22 (e.g., AZ1400 manufactured by SIHPLEY) mainly composed of a novolak resin and comprising a naphthoquinone diazido based photosensitizer containing the group represented by (formula 2) was applied onto a surface of a glass substrate 21 provided with TFT always having pixel electrodes on their surfaces to a thickness of 0.1 to 0.2 μm and dried so as to form a film. The critical surface energy of the film was 28 mN/m. Next, using a photomask 23 for dividing each pixel (a polarizing plate or a diffraction grating may be disposed on the mask for dividing the pixel for the purpose of improving the alignment property of the adsorption film), the positive resist was exposed to light of 435 nm at 100 mJ/cm² (FIG. 5). As a result, the resist reacted with moisture in the air in an exposed portion 22' so as to proceed the reaction represented by (formula 5). At this time, since —COOH group 25 generated by the exposure contains active hydrogen (FIG. 6, which is a partially enlarged view of portion B of FIG. 5), a dehydrochlorination reaction was effected in combination with SiCl groups.

Then, by mixing a nonaqueous solvent with a substance comprising hydrocarbon groups and chlorosilyl groups, for example, by dissolving $CH_3(CH_2)_{13}SiCl_3$ in Afulude (manufactured by Asahi Glass Co., Ltd, a fluorine based solvent) in a concentration of about 1 wt %, an adsorption solution was prepared. Then, the exposed substrate 24 was immersed in the adsorption solution in a dry atmosphere (a relative humidity of 30% or less) for 5 minutes.

Figure 7:
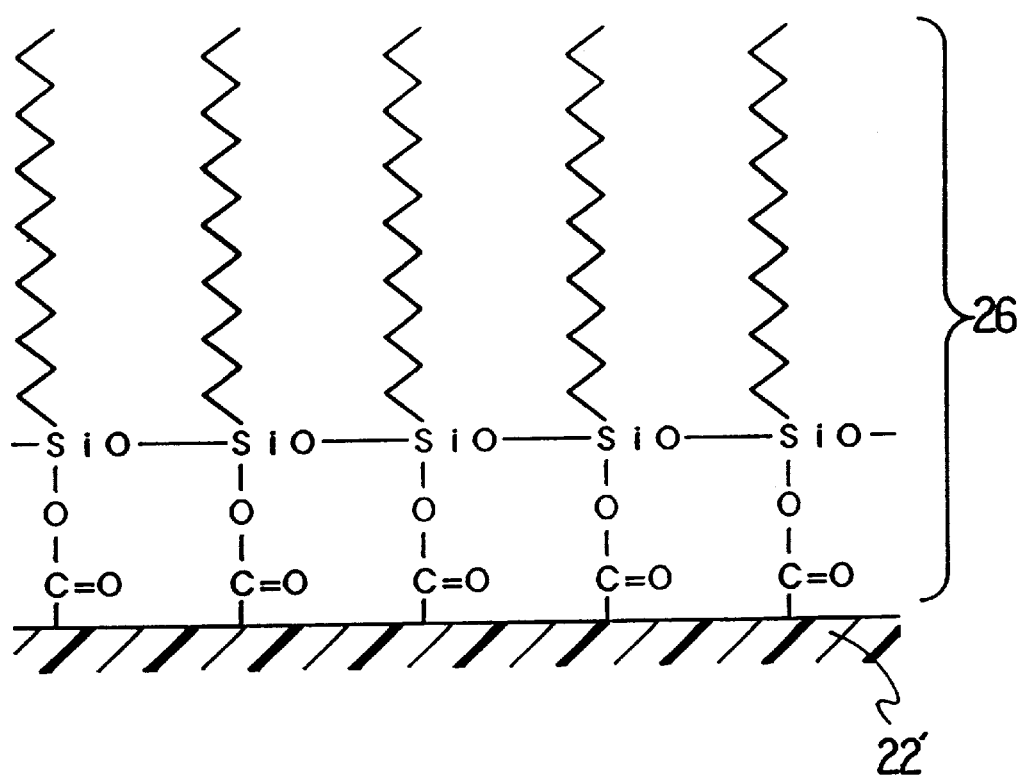
FIG. 7 is a schematic view of portion B in FIG. 5 enlarged to a molecular level showing a lipophilic surface portion in which a chemisorption film is formed.

Thereafter, the substrate was lifted from the solution, and washed with a fluorine based solvent (e.g., Fluorinert PF5080 (3M product name)). Since the exposed portion on the surface of the substrate contains a large number of —COOH (carboxyl groups), a dehydrochlorination reaction was caused between the SiCl groups of the substance containing hydrocarbon groups and chlorosilyl groups and the carboxyl groups, thereby generating bonds represented by (formula 11) below selectively in the exposed portion. Thus, a chemisorption film 26 containing hydrocarbon groups was formed in a thickness of about 15 Å (1.5 nm) selectively in the exposed portion through chemical bonds (FIG. 7, which is a partially enlarged view of portion B of FIG. 5). The treated portion became water-repelling and oil-repelling.

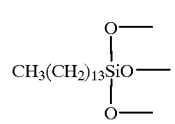

(formula 11)

Figure 8:
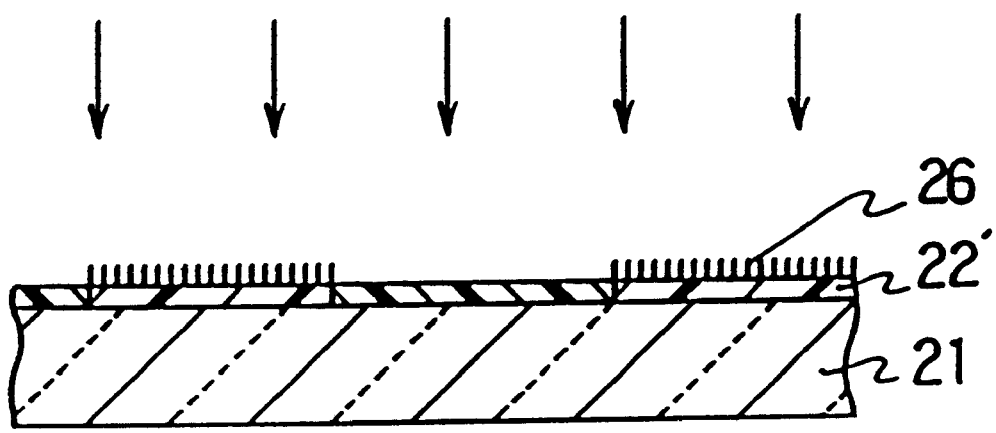
FIG. 8 is a view for illustrating a process for generating carboxyl groups newly by a second exposure in Example 2 of the present invention.
Figure 9:
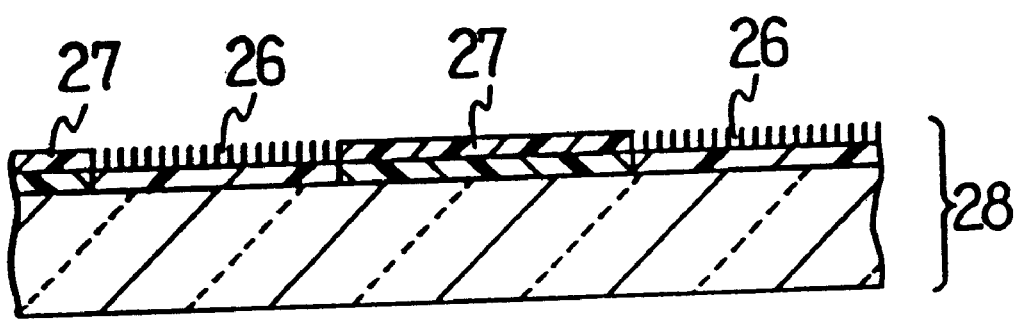
FIG. 9 is a schematic cross-sectional view of a liquid crystal alignment film for illustrating a state where two types of chemisorption films each having a different alignment direction are formed in Example 2.

Furthermore, after an unexposed portion was entirely exposed (the exposure may be performed through a mask) (FIG. 8), the substrate was immersed for 5 minutes in a second adsorption reagent, for example an adsorption solution prepared by dissolving $CH_3(CH_2)_9SiCl_3$ and $CH_3SiCl_3$ at a mole ratio of 1:5 so as to have the same concentration as above. Thereafter, the substrate was lifted from the solution, and washed with a fluorine based solvent (e.g., Fluorinert PF5080 (3M product name)). Then, since the secondly exposed portion on the surface of the substrate contains a large number of —COOH (carboxyl groups), a dehydrochlorination reaction was effected between the SiCl groups of $CH_3(CH_2)_9SiCl_3$ and $CH_3SiCl_3$ and the carboxyl groups. Thus, a chemisorption film 27 containing hydrocarbon groups was formed in a thickness of about 10 Å (1.0 nm) selectively in the exposed portion through chemical bonds (FIG. 9). At this time, active groups were no longer present in the firstly adsorbed portion, and a monomolecular film was formed, so that the second adsorption was not effected at all. Thus, the firstly exposed and adsorbed portion 26 and the portion 27 having a different alignment direction were formed in one pixel. In the exposure process, when a polarizing plate or a diffraction grating was disposed on the mask, a monomolecular film having the adsorbed molecules aligned in stripes was formed selectively. Furthermore, the critical surface energy of the monomolecular film at this time was 20 mN/m.

Then, two substrates 28 were set so that the chemisorption films were facing each other, so as to assemble a liquid crystal cell having a 20 micron gap. Thereafter, nematic liquid crystal (ZLI4792 manufactured by Merck & Co., Inc.) was injected. When the orientation state was observed, it was confirmed that one pixel was constituted by a multi-domain having a portion where the injected liquid crystal molecules were aligned along the chemically adsorbed molecules and substantially perpendicular to the substrate and a portion where the injected liquid crystal molecules were aligned obliquely with respect to the substrate. In order words, in this case, since the pixel portion was divided into two, an alignment film having two domains of different alignment directions of liquid crystal was produced.

In order to increase the number of divisions, the exposure and adsorption process using a mask is repeated a desired number of times.

EXAMPLE 3

After exposure and before the process of chemisorption of the molecules comprising linear hydrocarbon groups in Example 1, the substrate was immersed in an adsorption solution prepared by dissolving a compound containing a plurality of chlorosilyl groups in a dry atmosphere. Then, a dehydrochlorination reaction was effected between hydroxyl groups of the carboxyl groups generated on the surface of the resist and chlorosilyl groups of the compounds containing a plurality of chlorosilyl groups. Thereafter, when a reaction with water was allowed to be effected, the remaining chlorosilyl groups changed to hydroxyl groups, so that a chemisorption film comprising a large number of hydroxyl groups on its surface was formed.

For example, $SiCl_4$ was used as the silyl compound containing a plurality of chloro groups, and dissolved in Fluorinert FC40 (3M product name) so as to prepare an adsorption solution. Then, the exposed substrate was immersed in the adsorption solution. As a result, since —COOH groups were formed in the exposed portion of the resist 32', a dehydrochlorination reaction was effected on the surface so as to form (formula 12) and/or (formula 13). Thus, chlorosilane molecules were fixed to the surface of the substrate in a pattern via —SiO— bonds.

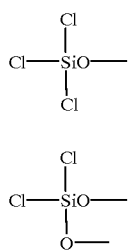

(formula 12)

(formula 13)

Figure 10:
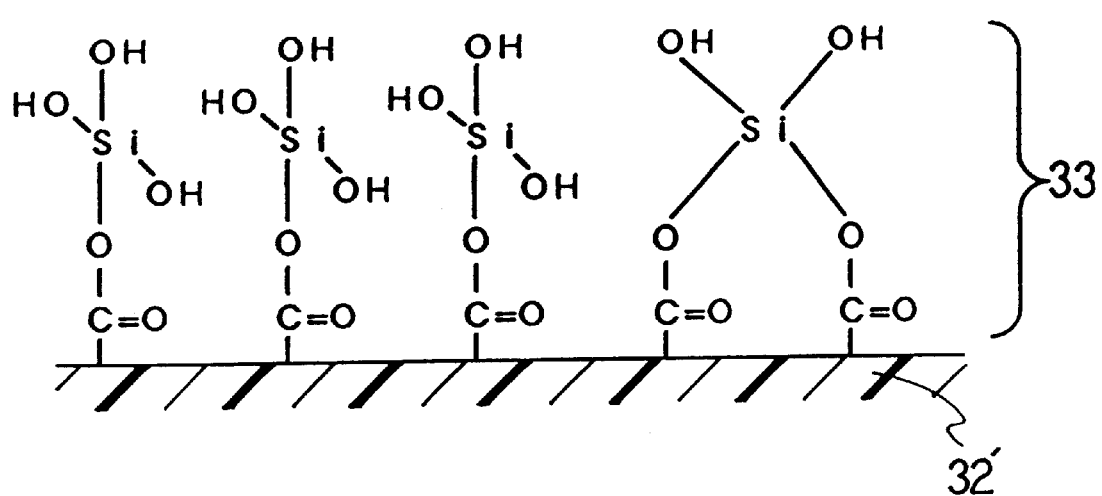
FIG. 10 is a schematic cross-sectional view enlarged to a molecular level for illustrating a state where a siloxane monomolecular film is formed in Example 3 of the present invention.

Thereafter, when the substrate was washed with a nonaqueous solvent, e.g., Fluorinert FX3252 (3M product name), the $SiCl_4$ molecules that had not reacted with the resist were removed, and further allowed to react with water. Then, a siloxane monomolecular adsorption film 33 represented by (formula 14) and (formula 15) was obtained on the surface (FIG. 10).

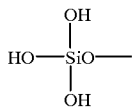

(formula 14)

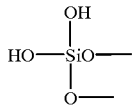

(formula 15)

When the process of washing with a nonaqueous solvent, e.g., Fluorinert FX3252 (3M product name) was omitted, a polysiloxane chemisorption film was formed.

Furthermore, since the thus obtained siloxane monomolecular film 33 was firmly bonded to the resist via the chemical bonds of —SiO—, it was not peeled off. Furthermore, the obtained monomolecular film has a large number of SiOH bonds on its surface. The SiOH bonds were generated in a number about twice or three times the original number of —COOH groups. The treated portions in this state were highly hydrophilic. Then, in this state, when the chemisorption process of the same substance comprising hydrocarbon groups as in Example 1 was performed, a monomolecular chemisorption film comprising hydrocarbon as shown in FIG. 1 was formed in a thickness of about 25 Å (2.5 nm) selectively in the exposed portion by being chemically bonded thereto through covalent bonds of siloxane via the siloxane monomolecular film. At this time, since the adsorption sites (OH groups in this case) on the surface of the substrate were about twice or three times as many as that in Example 1, the density of the adsorbed molecules was larger than that of Example 1. The treated portion became lipophilic. The molecules of the chemisorption film in this case, although having a different density, were aligned substantially perpendicular to the substrate in the same manner as the molecules shown in FIG. 3.

Then, two substrates in this state were set so that the chemisorption films were facing each other, so as to assemble a liquid crystal cell having a 20 micron gap. Thereafter, nematic liquid crystal (ZLI4792 manufactured by Merck & Co., Inc.) was injected. When the orientation state was observed, it was confirmed that the injected liquid crystal molecules were aligned along the chemically adsorbed molecules and substantially perpendicular to the substrate. In other words, this monomolecular film exhibited a perpendicular alignment function for liquid crystal. At this time, liquid crystal was not aligned uniformly in an unexposed portion.

As the silyl compound containing a plurality of chloro groups, compounds other than $SiCl_4$ described above, such as $Cl—(SiCl_2O)_2—SiCl_3$, or $SiHCl_3$, $SiH_2Cl_2$, or $Cl—(SiCl_2O)_n—SiCl_3$ (n is an integer), were usable.

EXAMPLE 4

Next, a production process in actually producing a liquid crystal display device by using the liquid crystal alignment film described above will be described with reference to FIG. 11.

Figure 11:
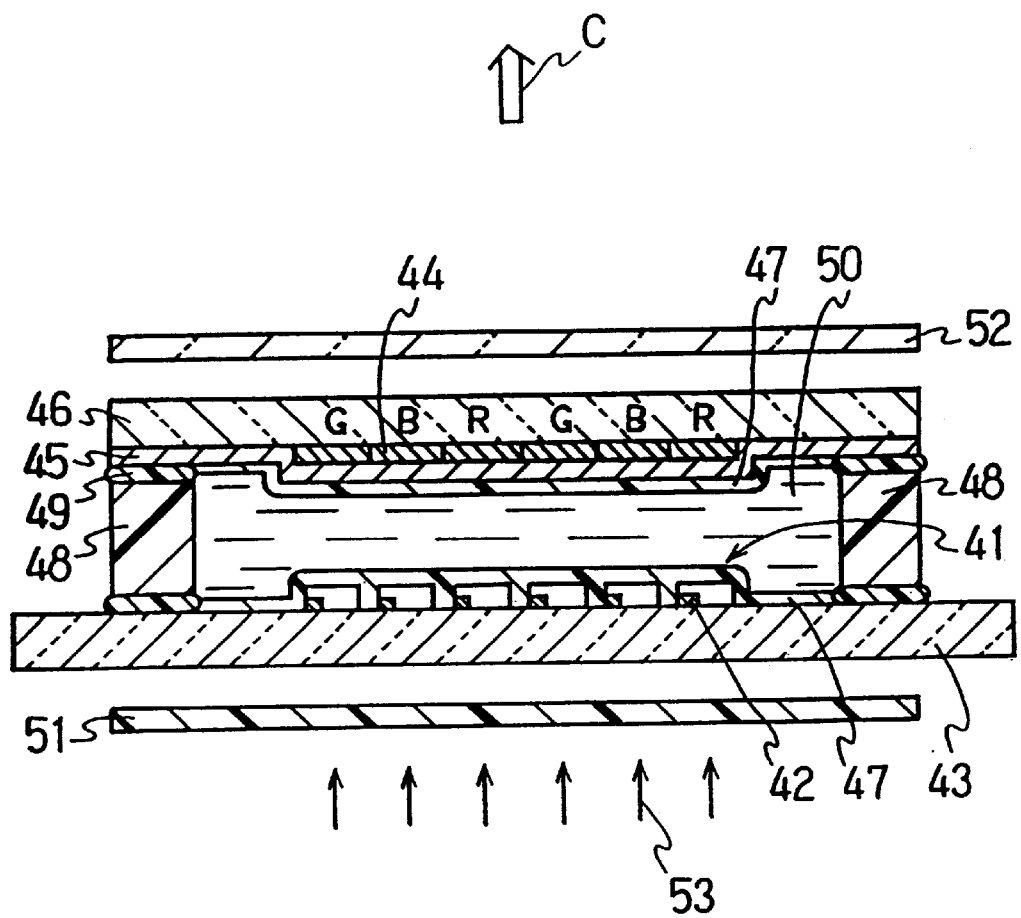
FIG. 11 is a schematic cross-sectional view for illustrating production of a liquid crystal display apparatus in Example 4 of the present invention.

First, the resin containing energy beam sensitive groups represented by (formula 2) was diluted to 5 wt % in ethylcellosolve acetate so as to prepare a sensitizing solution (e.g., a novolak based positive resist such as AZ1400 may be used) beforehand. As shown in FIG. 11, a first substrate 43 includes first electrode arrays 41 mounted in a matrix and transistor arrays 42 for driving the electrodes. A second substrate 46 includes color filter arrays 44 and second electrodes 45 opposed to the first electrode arrays. The prepared sensitizing solution was applied onto the both electrodes on the first substrate and the second substrate by rotary-coating, so as to form a photosensitive resin film (a novolak based positive resist film) in the same manner as Example 1. Thereafter, heating was performed at 100° C. for 10 minutes so as to remove the solvent to some extent. Then, a diffraction grating of 1000 slits/mm (a polarizing plate can be used) was used as a mask and arranged so that the grating was parallel to the electrode pattern. Then, light having a wavelength of 435 nm (g rays) (at 28 mJ/cm² after passing through the mask) was radiated at 500 W by using an extra-high pressure mercury lamp from the vertical direction for 5 seconds, so as to react naphthoquinone diazide in the photosensitive novolak based positive resist. As a result, —COOH groups were generated in the exposed portion in proportion to the extent of the exposure. Then, when the chemisorption process was performed in the same manner as in Example 1, a liquid crystal alignment film 47 in which linear hydrocarbon groups are aligned along the electrode pattern was produced. Next, the first and the second substrates 43 and 46 were positioned so that they were opposed to each other, and fixed with spacers 48 and an adhesive 49 with about a 5 micron gap. Thereafter, the TN liquid crystal 50 was injected between the first and the second substrates, and polarizing plates 51 and 52 were provided. Thus, a display device was completed.

Such a device was able to display images in the direction shown by arrow C by being entirely irradiated with backlight 53 and by driving each transistor with video signals.

EXAMPLE 5

Figure 12:
FIG. 12 is a schematic cross-sectional view for illustrating a chemisorption process performed for producing a monomolecular liquid crystal alignment film in Example 5 of the present invention.
Figure 13:
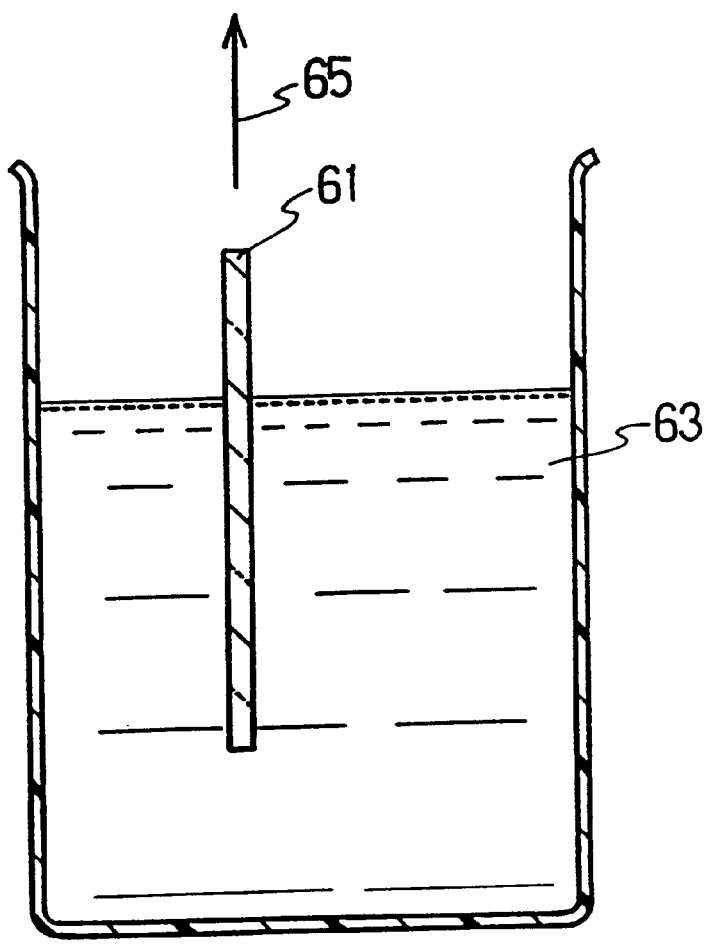
FIG. 13 is a schematic cross-sectional view for illustrating a washing process in producing a monomolecular liquid crystal alignment film in Example 5 of the present invention.

A glass substrate 61 (comprising a large number of hydroxyl groups on its surface) provided with transparent electrodes on its surface was prepared and washed and sufficiently degreased beforehand. Next, by using silane-based surfactants containing linear hydrocarbon groups as carbon chains and Si (hereinafter, referred to as a chemisorption compound), $CN(CH_2)_{14}SiCl_3$ and $CH_3SiCl_3$ (mixed at a mole ratio of 1:10), and dissolving them in a nonaqueous solvent in a concentration of about 1 wt %, a chemisorption solution was prepared. As the nonaqueous solvent, sufficiently dehydrated hexadecane was used. The thus prepared solution was used as an adsorption solution 62, and the substrate 61 was immersed in (or coated with) the adsorption solution 62 in a dry atmosphere (a relative humidity of 30% or less) for 50 minutes (FIG. 12). Thereafter, the substrate was lifted from the solution, and washed with sufficiently dehydrated n-hexane 63, which is a nonaqueous solvent. Then, the substrate was lifted from the washing solution while being tilted in a desired direction, the solution was drained off, and the substrate was then exposed to the air containing moisture (FIG. 13). Arrow 65 is a lifting direction. In the series of processes, a dehydrochlorination reaction was effected between SiCl groups of the chlorosilane-based surfactant and hydroxyl groups of the surface of the substrate, thereby generating the bonds represented by (formulae 16 and 17). Furthermore, a reaction was effected with moisture in the air, thereby generating the bonds represented by (formulae 18 and 19).

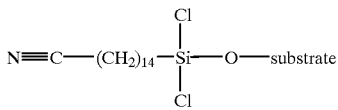
(formula 16)

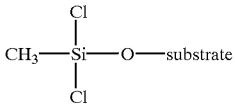
(formula 17)

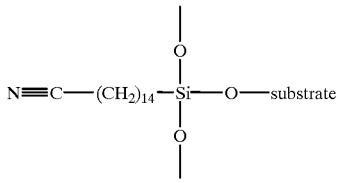
(formula 18)

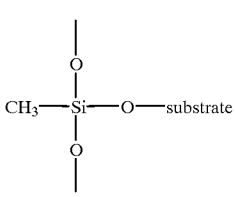
(formula 19)

Figure 14:
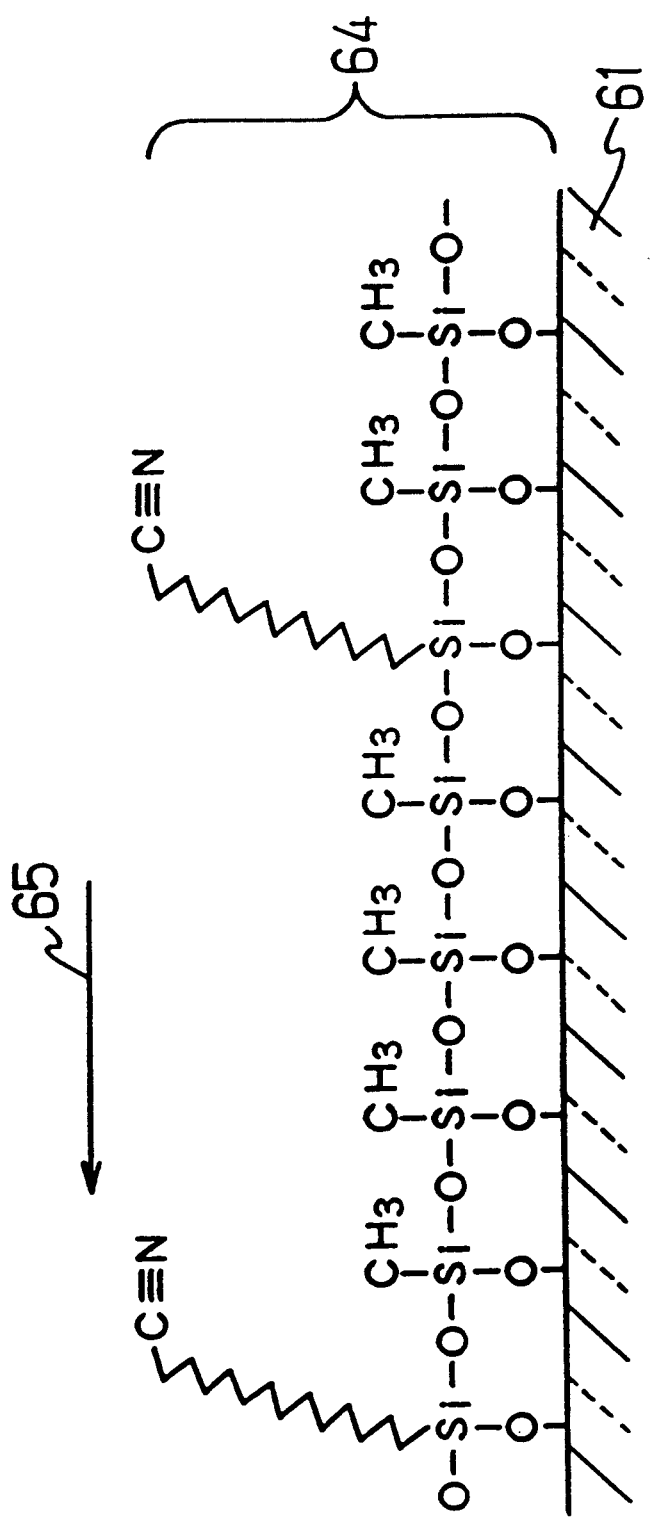
FIG. 14 is a schematic view of a cross section enlarged to a molecular level for illustrating a molecular orientation state in a monomolecular liquid crystal alignment film after washing with a solvent in Example 5 of the present invention.

By performing the above-described treatment, as a result of the reaction with the chlorosilane-based surfactants, a monomolecular chemisorption film 64 was formed in the portion on the surface of the substrate having hydroxyl groups. This monomolecular film was chemically bonded thereto via siloxane covalent bonds in a thickness of about 1 nm. The linear carbon chains of $CN(CH_2)_{14}Si-$ in the chemisorption film were aligned at a tilt angle of 20° in a direction substantially opposite to a direction 65 in which the substrate had been lifted from the washing solution (FIG. 14). In order words, the orientation of the adsorbed and fixed molecules were generally aligned uniformly for the first alignment. By changing the composition of $CN(CH_2)_{14}SiCl_3$ and $CH_3SiCl_3$ in the range from 1:0 to 0:1 (preferably 10:1 to 1:50), the tilt angle was able to be controlled arbitrarily in the range from 0° to 90°. In order to form a film selectively, the adsorption solution 62 can be printed on the surface of the substrate 61 in a desired pattern with a printer. Furthermore, after the surface of the substrate is covered with a resist selectively beforehand, the chemisorption process may be performed and the resist may be removed. In this case, since the chemically adsorbed film is not peeled off by an organic solvent, a resist that can be dissolved and removed by an organic solvent is used.

EXAMPLE 6

Figure 15:
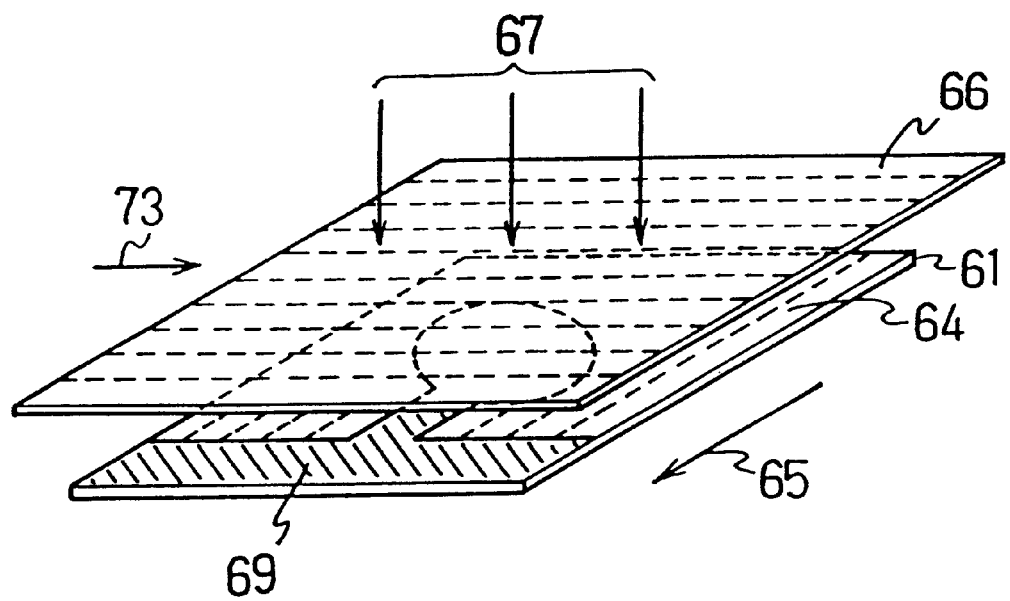
FIG. 15 is a schematic view of an exposure process performed for realigning adsorbed molecules by light exposure in Example 6 of the present invention.

The substrate obtained in Example 5 was used. A polarizing plate (HNP'B) 66 (manufactured by POLAROID) was disposed on the substrate so that the polarizing direction was substantially orthogonal to a lifting direction. Then, they were irradiated with light 67 of 365 nm (i rays) by an extra-high pressure mercury lamp at 100 mJ/cm². In order to align the orientations of the adsorbed molecules uniformly in one direction, it is necessary to deviate the polarizing direction by some degrees, preferably several degrees or more from 90°, rather than allowing the polarizing direction to intersect the lifting direction exactly by 90° (at the maximum, the polarizing direction may be parallel to the direction in which the solution had been drained off). If they intersect each other exactly by 90°, the molecules may be oriented in two directions (FIG. 15). In FIG. 15, arrow 73 denotes the polarizing direction.

Figure 16:
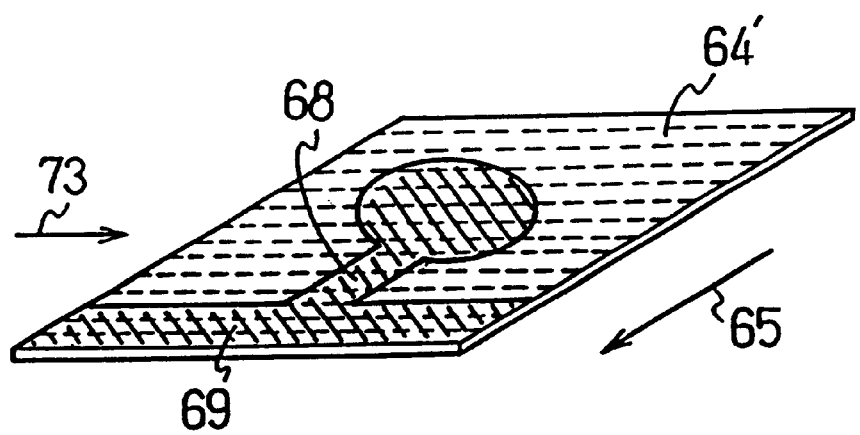
FIG. 16 is a schematic view for illustrating a molecular orientation state in a monomolecular liquid crystal alignment film after alignment with light in Example 6 of the present invention.
Figure 17:
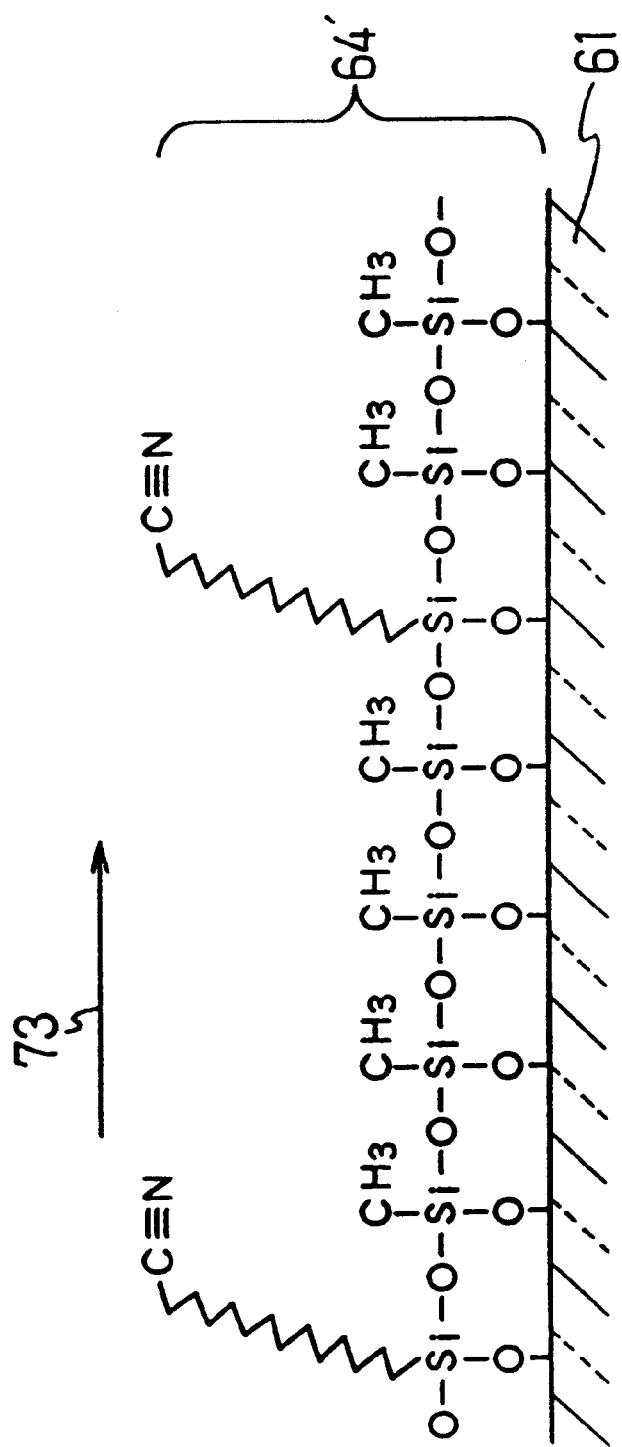
FIG. 17 is a schematic view of a cross section enlarged to a molecular level for illustrating a molecular orientation state of a monomolecular chemisorption film after alignment with light in Example 6 of the present invention.

Thereafter, when the orientation of the linear carbon chains in the monomolecular chemisorption film 64' was examined, the tilt angle remained unchanged, but the orientation 68 was changed to a direction substantially orthogonal to the lifting direction. In addition, the non-uniformity of the orientation was alleviated compared with that at the first alignment (FIGS. 16 and 17). In the Figure, reference numeral 69 denotes transparent electrodes.

In order to change the orientation selectively, a process in which a desired mask was disposed on the polarizing plate and then exposure was performed was repeated a plurality of times. Thus, a monomolecular liquid crystal alignment film having different alignment directions in a pattern was produced easily.

In this example, as a solvent containing no water for washing, a solvent containing an alkyl group such as a hydrocarbon based n-hexane was used, but any other solvents can be used, as long as it contains no water and dissolves a surfactant. For example, in addition to that, a solvent containing a carbon fluoride group, a carbon chloride group or a siloxane group, such as Freon 113, chloroform, hexamethyldisiloxane or the like, was usable.

EXAMPLE 7

The same experiment as Example 5 was performed, except that $CH_3(CH_2)_{14}SiCl_3$ and $NC(CH_2)_{14}SiCl_3$ comprising linear hydrocarbon groups having one functional group for controlling surface energy of a film at the terminal and Si were used as the silane-based surfactant (by being mixed at a mole ratio of 1:1).

As a result of the reaction with the chlorosilane-based surfactant, a monomolecular chemisorption film was formed selectively in the portion on the surface of the substrate where hydroxyl groups have been generated. This monomolecular film was chemically bonded thereto via siloxane covalent bonds in a thickness of about 1.5 nm. The critical surface energy of the chemisorption film was about 27 mN/m.

Furthermore, two substrates in this state were used and set so that the chemisorption films were facing each other. Thus, a liquid crystal cell having a 20 micron gap was assembled so that an anti-parallel orientation was obtained, and then nematic liquid crystal (ZLI4792 manufactured by Merck & Co., Inc.) was injected. When observing the orientation state in the portion where the monomolecular film was formed, the injected liquid crystal molecules were aligned substantially along the chemically adsorbed molecules with a pre-tilt angle of 65° with respect to the substrate in the direction opposite to the direction in which the substrate had been lifted from the washing solution.

At this time, when the composition of $CH_3(CH_2)_{14}SiCl_3$ and $NC(CH_2)_{14}SiCl_3$ was changed in the range of 1:0 to 0:1 (preferably 10:1 to 1:50), the critical surface energy was changed from 20 mN/m to 29 mN/m, and the pre-tilt angle was able to be controlled arbitrarily in the range from 90° to 40°. Furthermore, when a surfactant containing fluorine such as $CF_3(CF_2)_5(CH_2)_2SiCl_3$ was added as a chemisorption compound, the critical surface energy was reduced to 15 mN/m.

EXAMPLE 8

Before the process of chemisorption of the surfactant molecules comprising carbon chains and siloxane bond chains in Example 5, an adsorption solution was prepared by dissolving a compound containing a plurality of chlorosilyl groups, and the substrate was immersed in the adsorption solution in a dry atmosphere. Then, a dehydrochlorination reaction was effected between hydroxyl groups present on the surface of the substrate and chlorosilyl groups of the compound containing a plurality of chlorosilyl groups. Thereafter; a reaction with water was allowed to be effected and the remaining chlorosilyl groups changed to hydroxyl groups, so that a chemisorption film comprising a large number of hydroxyl groups on its surface was formed.

For example, $SiCl_4$ was used as the silyl compound containing a plurality of chloro groups, and dissolved in n-octane so as to prepare an adsorption solution. Then, the substrate was immersed in the adsorption solution in a dry atmosphere. As a result, since —OH groups were present on the surface, a dehydrochlorination reaction was effected at the interface so as to form (formula 20) and/or (formula 21). Thus, chlorosilane molecules 71 were fixed to the surface of the substrate via —SiO— bonds.

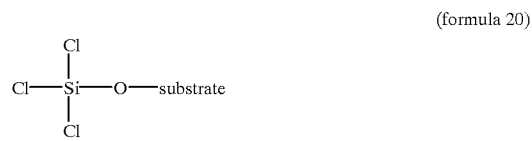

(formula 20)

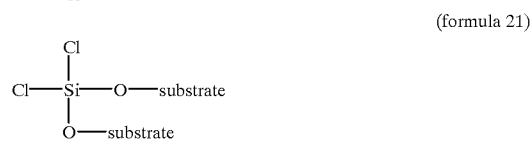

(formula 21)

Figure 18:
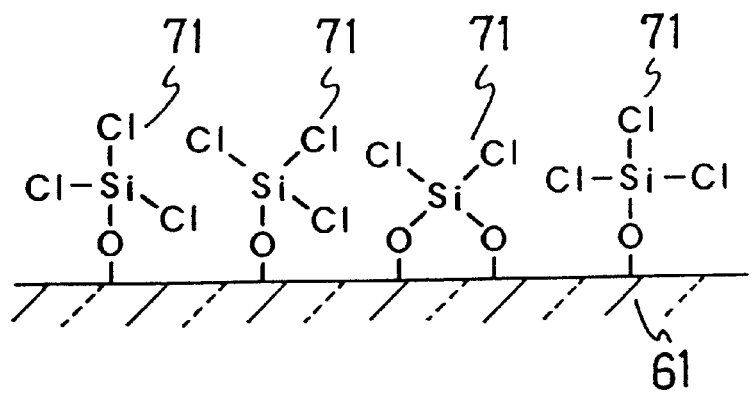
FIG. 18 is a schematic cross-sectional view enlarged to a molecular level for illustrating a state (before a reaction with moisture in the air) where a chlorosilane monomolecular film is formed in Example 8 of the present invention.
Figure 19:
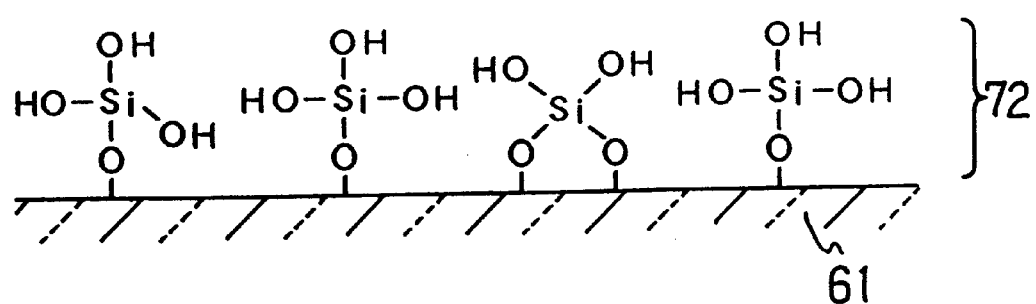
FIG. 19 is a schematic cross-sectional view enlarged to a molecular level for illustrating a state where a siloxane monomolecular film is formed in Example 8 of the present invention.

Thereafter, when the substrate was washed with a non-aqueous solvent such as chloroform, extra $SiCl_4$ molecules that had not reacted with the substrate were removed (FIG. 18). When the substrate was taken out in the air so as to react with water, a siloxane monomolecular adsorption film 72 containing a large number of SiO bonds represented by (formula 22) and/or (formula 23) was obtained on the surface (FIG. 19).

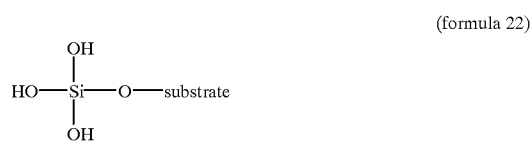

(formula 22)

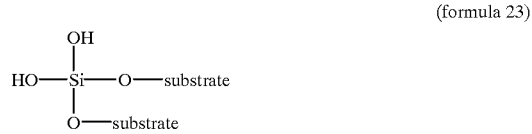

(formula 23)

When the process of washing with a nonaqueous solvent such as chloroform was omitted, a polysiloxane chemisorption film was formed.

Furthermore, since the thus obtained siloxane monomolecular film 72 was firmly bonded to the substrate via the chemical bonds of —SiO—, it was not peeled off. Furthermore, the obtained monomolecular film has a large number of SiOH bonds on its surface. The SiOH bonds were generated in a number about twice or three times the original number of —OH groups. The treated portion in this state was highly hydrophilic. Then, in this state, when the chemisorption process was performed by using the same surfactant as in Example 5, the same monomolecular chemisorption film comprising carbon chains obtained as a result of the reaction of the surfactant as in FIG. 14 was formed in a thickness of about 1 nm by being chemically bonded through covalent bonds of siloxane via the siloxane monomolecular film. At this time, since the adsorption sites (OH groups in this case) on the surface of the substrate before the adsorption of the surfactant were about twice or three times as many as that in Example 5, the density of the adsorbed molecules was larger than that of Example 5. Furthermore, the treated portion became lipophilic. The molecules of the chemisorption film in this case, although having a different molecular density, were aligned in the direction opposite to the lifting direction, namely the direction in which the solution had been drained off.

Next, two substrates in this state were used, and a polarizing plate was disposed on the substrate so that the polarizing direction was substantially orthogonal to the lifting direction. Then, they were irradiated with a KrF excimer laser of 248 nm at 80 mJ/cm$^2$. Thereafter, when the orientation of the linear carbon chains in the monomolecular chemisorption film was examined, the tilt angle was 25°, which was slightly larger, and the orientation was changed to a direction substantially orthogonal to the lifting direction. In addition, non-uniformity of the orientation was alleviated.

Then, two substrates in this state were set so that the chemisorption films were facing each other, so as to assemble a liquid crystal cell having a 20 micron gap so that an anti-parallel orientation was obtained. Thereafter, nematic liquid crystal (ZLI4792 manufactured by Merck & Co., Inc.) was injected. When the orientation state was observed, it was confirmed that the injected liquid crystal molecules were aligned along the chemically adsorbed molecules and substantially at about 25° with respect to the substrate.

As the silyl compound containing a plurality of chloro groups, compounds other than $SiCl_4$ described above, such as $Cl-(SiCl_2O)_2-SiCl_3$, or $SiHCl_3$, $SiH_2Cl_2$, or $Cl-(SiCl_2O)_n-SiCl_3$ (n is an integer), were usable.

EXAMPLE 9

Next, a production process in actually producing a liquid crystal display device by using the above-described alignment film will be described with reference to FIG. 20.

Figure 20:
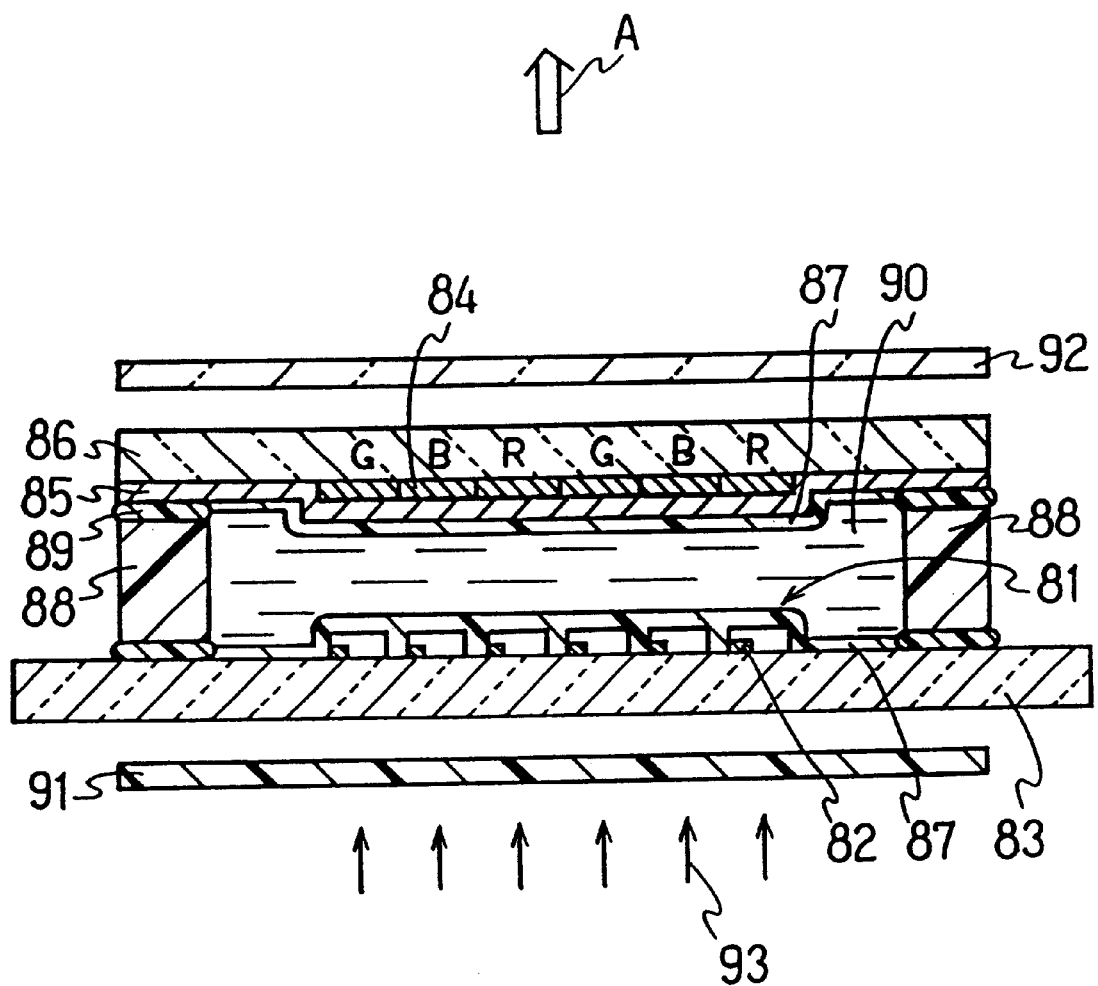
FIG. 20 is a schematic cross-sectional view for illustrating production of a liquid crystal display apparatus in Example 9 of the present invention.

First, as shown in FIG. 20, a first substrate 83 includes first electrode arrays 81 mounted in a matrix and transistor arrays 82 for driving the electrodes. A second substrate 86 includes color filter arrays 84 and second electrodes 85 opposed to the first electrode arrays. A chemisorption solution was applied onto the first substrate and the second substrate by rotary-coating, so as to form a chemisorption film in the same manner as Example 5. Thereafter, a polarizing plate HNP'B (manufactured by POLAROID) was used and disposed so that the polarizing direction was parallel to the electrode pattern. Then, light having a wavelength of 365 nm (i rays) (at 3.6 mJ/cm$^2$·s after passing through the polarizing plate) was radiated at 500 W by using an extra-high pressure mercury lamp from the vertical direction for 20 seconds. Thus, a liquid crystal alignment film 87 in which linear hydrocarbon groups were realigned along the electrode pattern was produced as in Example 5. Next, the first and the second substrates 83 and 86 were positioned so that the respective electrodes were opposed, and fixed with spacers 88 and an adhesive 89 with about a 5 micron gap. Thereafter, the TN liquid crystal 90 was injected between the first and the second substrates, and polarizing plates 91 and 92 were provided. Thus, a display device was completed.

Such a device was able to display images to the direction shown by arrow A by being entirely irradiated with backlight 93 and by driving each transistor with video signals.

EXAMPLE 10

In the light realignment process in Example 9, when the process of disposing a patterned mask for dividing each pixel into four sections in a checkerboard pattern on the polarizing plate for exposure was carried out twice, four sections each having a different alignment direction in a pattern were formed in one pixel. Thus, when the substrate provided with this alignment film was used, the viewing angle of the liquid crystal display apparatus was significantly improved.

EXAMPLE 11

As a chemisorption compound, $CH_3(CH_2)_{18}SiCl_3$ and $CH_3(CH_2)_3SiCl_3$ were used (by being mixed at a mole ratio of 1: 1), and dissolved in a nonaqueous solvent in a concentration of about 1 wt % so as to prepare a chemisorption solution. As the nonaqueous solvent, sufficiently dehydrated hexadecane was used. The thus prepared solution was used as an adsorption solution, and the substrate provided with electrodes was immersed in the adsorption solution in a dry atmosphere (a relative humidity of 30% or less) for 1 hour in the same manner as in Example 5. Thereafter, the substrate was lifted from the solution, and washed with sufficiently dehydrated water-free n-hexane, which was a nonaqueous solvent. Then, the substrate was lifted from the washing solution while being tilted in a desired direction, the solution was drained off, and the substrate was then exposed to the air containing moisture in the same manner as in FIG. 13.

Figure 21:
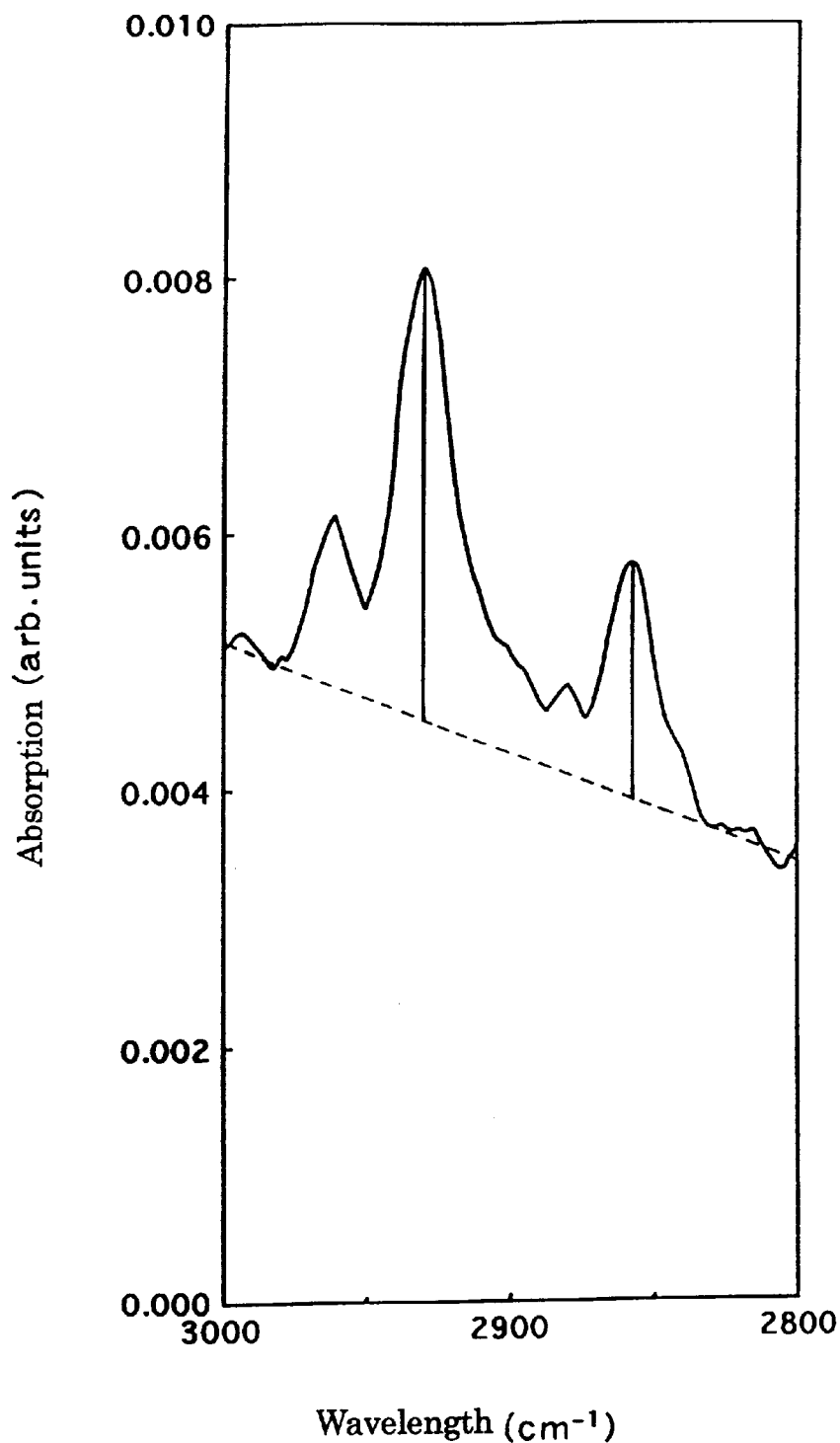
FIG. 21 shows an absorption spectrum of FTIR measured in a direction perpendicular to a lifting direction in Example 11 of the present invention.
Figure 22:
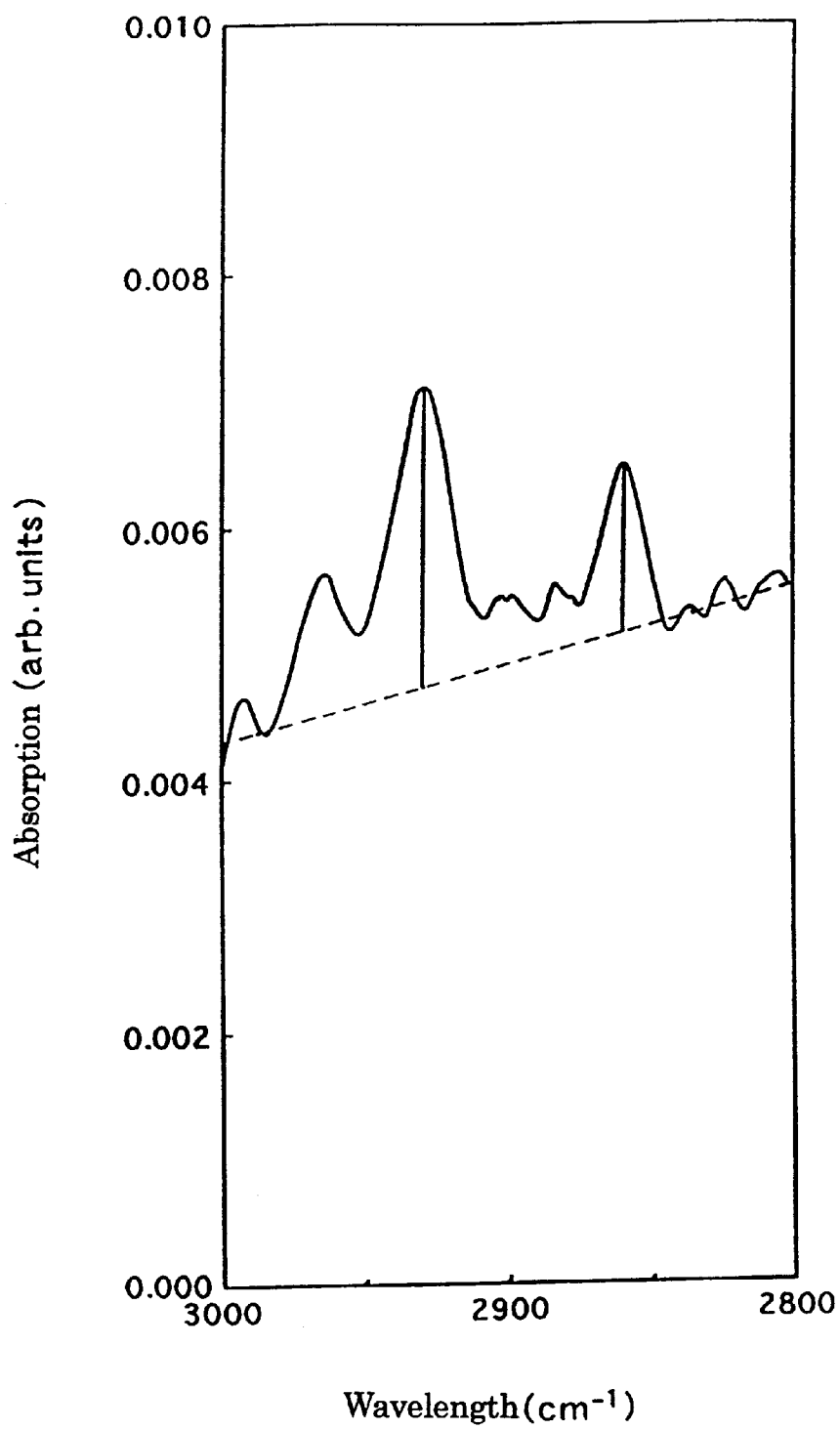
FIG. 22 shows an absorption spectrum of FTIR measured in a direction parallel to the lifting direction in Example 11 of the present invention.

Thereafter, FTIR was used to examine and analyze the first alignment. The results are shown in FIGS. 21 and 22. As seen from FIGS. 21 and 22, the absorption spectrum measured in a direction perpendicular to a lifting direction (FIG. 21) has a different absorption pattern from the absorption spectrum measured in a direction parallel to a lifting direction (FIG. 22). In FIG. 21, the absorption intensity at 2930 cm$^{-1}$ due to the asymmetric stretching vibration of $CH_2$ is twice the absorption intensity at 2857 cm$^{-1}$ due to the symmetric stretching vibration of $CH_2$, whereas in FIG. 22, the absorption intensity at 2929 cm$^{-1}$ due to the asymmetric stretching vibration of $CH_2$ is about 1.7 times the absorption intensity at 2859 cm$^{-1}$ due to the symmetric stretching vibration of $CH_2$. Furthermore, the absorption peak at 2930 cm$^{-1}$ shifted to red, and the absorption peak at 2857 cm$^{-1}$ shifted to blue. This indicates that the hydrocarbon chains of the adsorbed and fixed molecules are aligned in a direction parallel to the lifting direction, namely in the direction in which the solution had been drained off.

Furthermore, two substrates in this state were used so as to be set so that the chemisorption films were facing each other. Thus, a liquid crystal cell having a 20 micron gap was assembled so that an anti-parallel orientation was obtained, and then nematic liquid crystal (ZLI4792 manufactured by Merck & Co., Inc.) was injected and a polarizing plate was used. When observing the orientation state, the injected liquid crystal molecules were aligned substantially in a direction in which the solution had been drained off, namely the direction opposite to the direction in which the substrate had been lifted from the washing solution. Furthermore, the cell was sandwiched between two polarizing plates combined under crossed Nicole. Then, in the cases where a voltage of 20 volts was applied and no voltage was applied to electrodes, namely in the cases where the cell was on and off, the transmittance was measured. As a result, a contrast of 358 was obtained. This indicates that the lifting alignment process alone provides an alignment property of a practical level.

In Examples 6, 8, 9 and 10, light of 365 nm which is i rays from an extra-high pressure mercury lamp or light of 248 nm obtainable from a KrF excimer laser was used as light for exposure. However, light of 436 nm, 405 nm or 254 nm can be used, depending on the degree of absorption of light by a film substance. In particular, light of 248 nm or 254 nm provides a high alignment efficiency because it is absorbed by most substances readily.

Furthermore, in the above-described example, as the silane-based surfactant comprising linear hydrocarbon groups or siloxane bond chains and chlorosilyl groups, alkoxysilyl groups or isocyanate silyl groups, a chlorosilane-based surfactant comprising a cyano group on one end of its molecule and a chlorosilyl group at the other end, mixed with a chlorosilane-based surfactant comprising a methyl group and a chlorosilyl group, was used. In order words, two types of chlorosilane-based surfactants having different molecular lengths were used by being mixed. However, the present invention is not limited thereto, and a chlorosilane-based surfactant comprising a halogen atom or a methyl group (—CH$_3$), a phenyl group (—C$_6$H$_5$), a cyano group (—CN), or a carbon trifluoride group (—CF$_3$) at the terminal of a hydrocarbon group, or a chlorosilane-based surfactant in which a carbon of a part of a hydrocarbon group in its molecule has an optical activity (in this case, in particular, the molecules were aligned efficiently), as shown below, was usable.

Furthermore, a chlorosilane-based surfactant represented by Ha(CH$_2$)$_n$SiCl$_3$ (Ha represents a halogen atom such as chlorine, bromine, iodine, fluorine, or the like, and n is an integer, preferably of 1 to 24) can be used. Moreover, the following compounds can be used.

(1) CH$_3$(CH$_2$)$_n$SiCl$_3$ (n is an integer, preferably of 0 to 24.)
(2) CH$_3$(CH$_2$)$_p$Si(CH$_3$)$_2$(CH$_2$)$_q$SiCl$_3$ (p and q are integers, preferably of 0 to 10.)
(3) CH$_3$COO(CH$_2$)$_m$SiCl$_3$ (m is an integer, preferably of 7 to 24.)
(4) C$_6$H$_5$(CH$_2$)$_n$SiCl$_3$ (n is an integer, preferably of 0 to 24.)
(5) CN(CH$_2$)$_n$SiCl$_3$ (n is an integer, preferably of 0 to 24.)
(6) Cl$_3$Si(CH$_2$)$_n$SiCl$_3$ (n is an integer, preferably of 3 to 24.)
(7) Cl$_3$Si(CH$_2$)$_2$(CF$_2$)$_n$(CH$_2$)$_2$SiCl$_3$ (n is an integer, preferably of 1 to 10.)
(8) Br(CH$_2$)$_8$SiCl$_3$
(9) CH$_3$(CH$_2$)$_{17}$SiCl$_3$
(10) CH$_3$(CH$_2$)$_5$Si(CH$_3$)$_2$(CH$_2$)(CH$_2$)$_8$SiCl$_3$
(11) CH$_3$COO(CH$_2$)$_{14}$SiCl$_3$
(12) C$_6$H$_5$(CH$_2$)$_8$SiCl$_3$
(13) CN(CH$_2$)$_{14}$SiCl$_3$
(14) Cl$_3$Si(CH$_2$)$_8$SiCl$_3$
(15) Cl$_3$Si(CH$_2$)$_2$(CF$_2$)$_4$(CH$_2$)$_2$SiCl$_3$
(16) Cl$_3$Si(CH$_2$)$_2$(CF$_2$)$_6$(CH$_2$)$_2$SiCl$_3$
(17) CF$_3$CF$_3$(CF$_2$)$_7$(CH$_2$)$_2$SiCl$_3$
(18) CF$_3$CF$_3$CH$_2$O(CH$_2$)$_{15}$Si(CH$_3$)$_2$Cl
(19) CF$_3$CF$_3$(CH$_2$)$_2$Si(CH$_3$)$_2$(CH$_2$)$_{15}$SiCl$_3$
(20) F(CCF$_3$(CF$_2$)$_4$(CH$_2$)$_2$Si(CH$_3$)$_2$(CH$_2$)$_9$SiCl$_3$
(21) (CF$_2$)$_8$(CH$_2$)$_2$Si(CH$_3$)$_2$(CH$_2$)$_9$SiCl$_3$
(22) CF$_3$COO(CH$_2$)$_{15}$SiCH$_3$Cl$_2$
(23) CF$_3$(CF$_2$)$_5$(CH$_2$)$_2$SiCl$_3$
(24) CH$_3$CH$_2$CHC*H$_3$CH$_2$OCO(CH$_2$)$_{10}$SiCl$_3$
(25) CH$_3$CH$_2$CHC*H$_3$CH$_2$OCOC$_6$H$_4$OCOC$_6$H$_4$O(CH$_2$)$_5$SiCl$_3$, wherein C* indicates an optically active carbon.

Furthermore, the following compounds comprising a siloxane bond chain and a chlorosilyl group, or an alkoxysilyl group or an isocyanate silyl group were usable (in this case as well, a film having a high alignment was obtained).

(26) CLSi(CH$_3$)$_2$OSi(CH$_3$)$_2$OSi(CH$_3$)$_2$OSi(CH$_2$)$_2$Cl
(27) Cl$_3$SiOSi(CH$_3$)$_2$OSi(CH$_3$)$_2$OSi(CH$_3$)$_2$OSi(CH$_3$)$_2$OSiCl$_3$

Furthermore, in addition to the chlorosilane-based surfactant, silane-based surfactants comprising an alkoxysilyl group or an isocyanate silyl group as shown below were usable.

(28) Ha(CH$_2$)$_n$Si(OCH$_3$)$_3$ (Ha represents a halogen atom such as chlorine, bromine, iodine, fluorine, or the like, and n is an integer, preferably of 1 to 24.)
(29) CH$_3$(CH$_2$)$_n$Si(NCO)$_3$ (n is an integer, preferably of 0 to 24.)
(30) CH$_3$(CH$_2$)$_p$Si(CH$_3$)$_2$(CH$_2$)$_q$Si(OCH$_3$)$_3$ (p and q are integers, preferably of 0 to 10.)
(31) HOOC(CH$_2$)$_m$Si(OCH$_3$)$_3$ (m is an integer, preferably of 7 to 24.)
(32) H$_2$N(CH$_2$)$_m$Si(OCH$_3$)$_3$ (m is an integer, preferably of 7 to 24.)
(33) C$_6$H$_5$(CH$_2$)$_n$Si(NCO)$_3$ (n is an integer, preferably of 0 to 24.)
(34) CN(CH$_2$)$_n$Si(OC$_2$H$_5$)$_3$ (n is an integer preferably of 0 to 24.)

EXAMPLE 12

Figure 23:
FIG. 23 is a schematic cross-sectional view for illustrating a chemisorption process performed for producing a monomolecular liquid crystal alignment film in Example 12 of the present invention.
Figure 24:
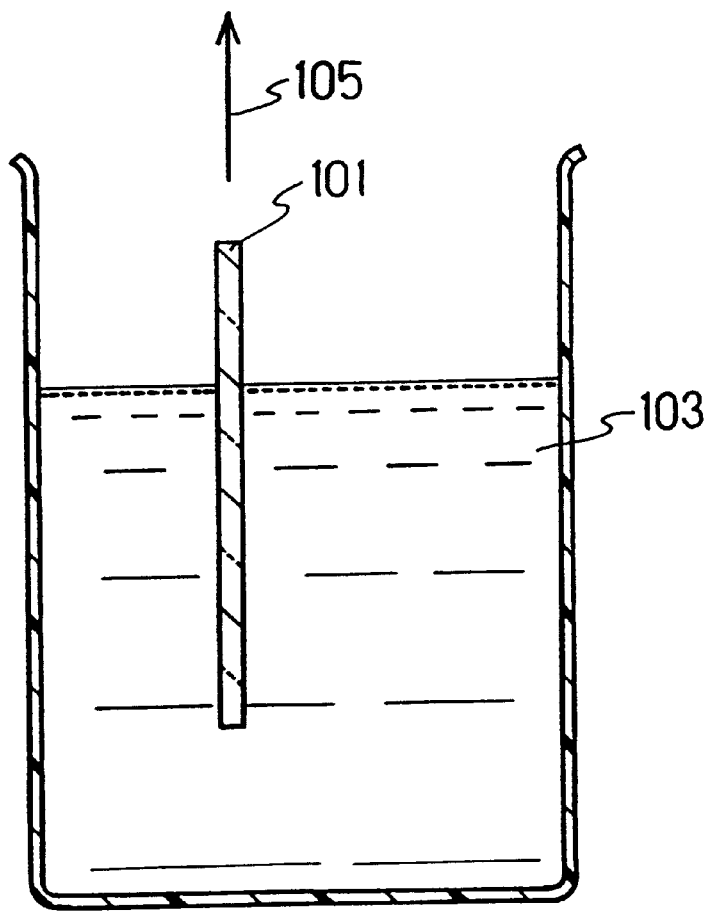
FIG. 24 is a schematic cross-sectional view for illustrating a washing process in producing a monomolecular liquid crystal alignment film in Example 12 of the present invention.

A glass substrate 101 (comprising a large number of hydroxyl groups on its surface) provided with transparent electrodes on its surface was prepared, and washed and sufficiently degreased beforehand. Next, by using silane-based surfactants containing a linear hydrocarbon group comprising a functional group for controlling the surface energy of a film at the terminal and Si (hereinafter, referred to as a chemisorption compound), CH$_3$(CH$_2$)$_{14}$SiCl$_3$ and NC(CH$_2$)$_{14}$SiCl$_3$ (mixed at a mole ratio of 1:1), and dissolving them in a nonaqueous solvent in a concentration of about 1 wt %, a chemisorption solution was prepared. As the nonaqueous solvent, sufficiently dehydrated hexadecane was used. The thus prepared solution was used as an adsorption solution 102, and the substrate 101 was immersed in (or coated with) the adsorption solution 102 in a dry atmosphere (a relative humidity of 30% or less) for about one hour (FIG. 23). Thereafter, the substrate was lifted from the solution, and washed with sufficiently dehydrated water-free n-hexane 103, which is a nonaqueous solution. Then, the substrate was lifted from the washing solution while being tilted in a desired direction, the solution was drained off, and the substrate was then exposed to the air containing moisture (FIG. 24). In the series of processes, a dehydrochlorination reaction was effected between SiCl groups of chlorosilane-based surfactant and hydroxyl groups on the surface of the substrate, thereby generating the bonds represented by (formulae 24 and 25). Furthermore, a reaction was effected with moisture in the air, thereby generating the bonds represented by (formulae 26 and 27).

(formula 24)

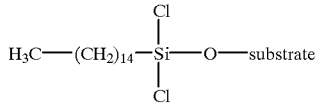

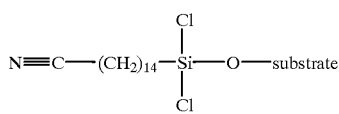

(formula 25)

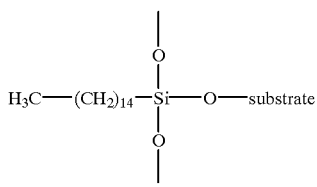

(formula 26)

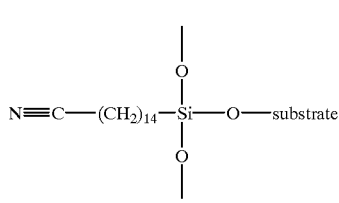

(formula 27)

By performing the above-described treatment, as a result of the reaction with the chlorosilane-based surfactants, a monomolecular chemisorption film 104 was formed in the portion on the surface of the substrate having hydroxyl groups. This monomolecular film was chemically bonded thereto via covalent bonds of siloxane in a thickness of about 1.5 nm. The critical surface energy of the chemisorption film at this time was about 27 mN/m.

Figure 25:
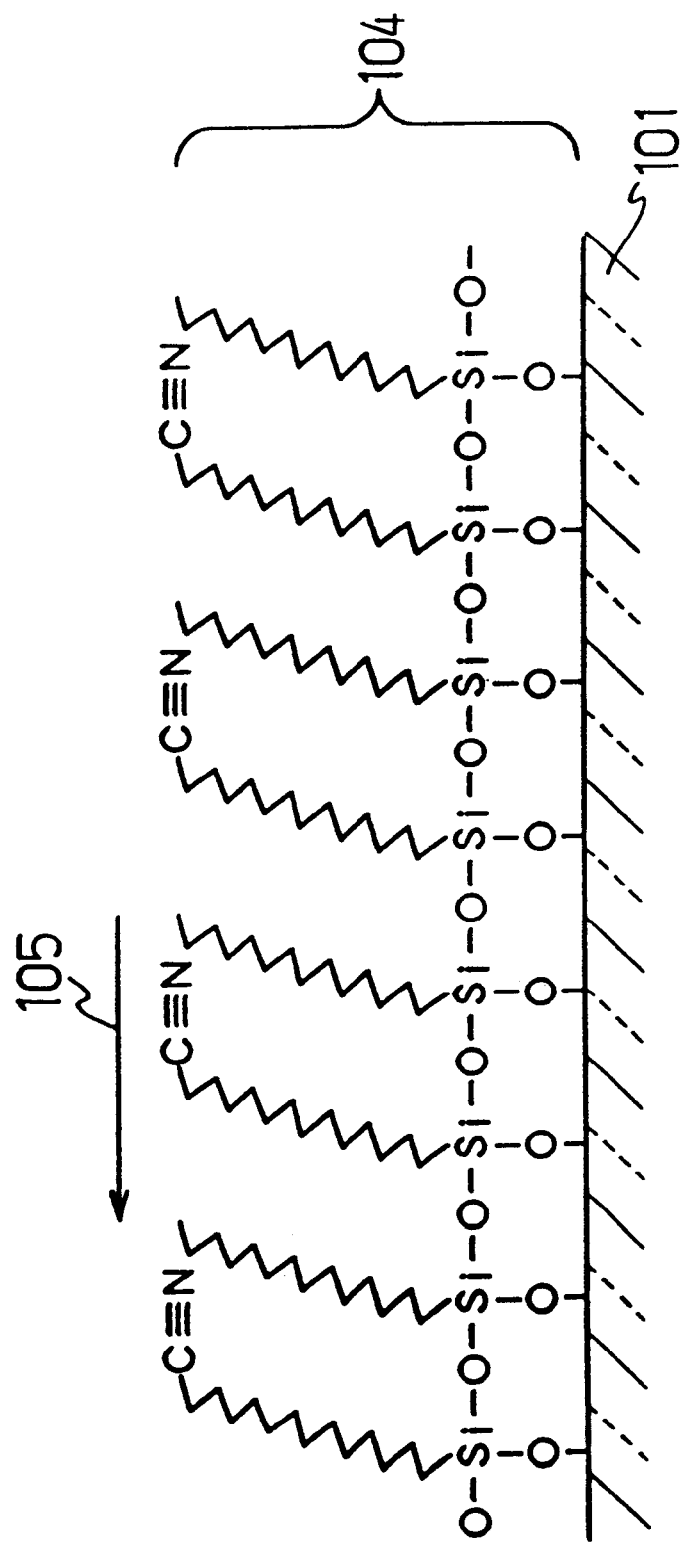
FIG. 25 is a schematic view of a cross section enlarged to a molecular level for illustrating a molecular orientation state in a monomolecular liquid crystal alignment film after washing with a solvent in Example 12 of the present invention.

Furthermore, two substrates in this state were used so as to be set so that the chemisorption films were facing each other. Thus, a liquid crystal cell having a 20 micron gap was assembled so that an anti-parallel orientation was obtained, and then nematic liquid crystal (ZLI4792 manufactured by Merck & Co., Inc.) was injected. When observing the orientation state, the injected liquid crystal molecules were aligned substantially along the chemically adsorbed molecules with a pre-tilt angle of about 65° with respect to the substrate in the direction opposite to the direction 105 in which the substrate had been lifted from the washing solution (FIG. 25).

At this time, when the composition of $CH_3(CH_2)_{14}SiCl_3$ and $NC(CH_2)_{14}SiCl_3$ was changed in the range of 1:0 to 0:1 (preferably 10:1 to 1:50), the critical surface energy was changed from 20 mN/m to 29 mN/m, and the pre-tilt angle was able to be controlled arbitrarily in the range from 90° to 40°. Furthermore, when a surfactant containing fluorine as a chemisorption compound such as $CF_3(CF_2)_5(CH_2)_2SiCl_3$ was added, the critical surface energy was reduced to 15 mN/m.

In order to form a film selectively, the adsorption solution 102 was able to be printed on the surface of the substrate 101 in a desired pattern with a printer. Furthermore, after the surface of the substrate is covered with a resist selectively beforehand, the chemisorption process may be performed and the resist be removed. In this case, since the chemically adsorbed film is not peeled off by an organic solvent, a resist that can be dissolved and removed by an organic solvent is used.

As described above, in this example, the silane-based surfactants that provide films each having a different critical surface energy and have the same carbon chain length as $—(CH_2)_{14}—$ were used. However, when the surfactants that have different carbon chain length (e.g., $—(CH_2)_n—$; n is an integer of 1 to 30) were mixed and used, an alignment regulation force was further enhanced.

Next, two substrates in this state were used, and a polarizing plate (HNP'B) 106 (manufactured by POLAROID) was disposed on the substrate so that the polarizing direction 113 was substantially orthogonal to a lifting direction 105. Then, light 107 having a wavelength of 365 nm (i rays) (at 3.6 mW/cm$^2$ after passing through the polarizing plate) was radiated at 500 W by using an extra-high pressure mercury lamp at 50mJ.

Figure 26:
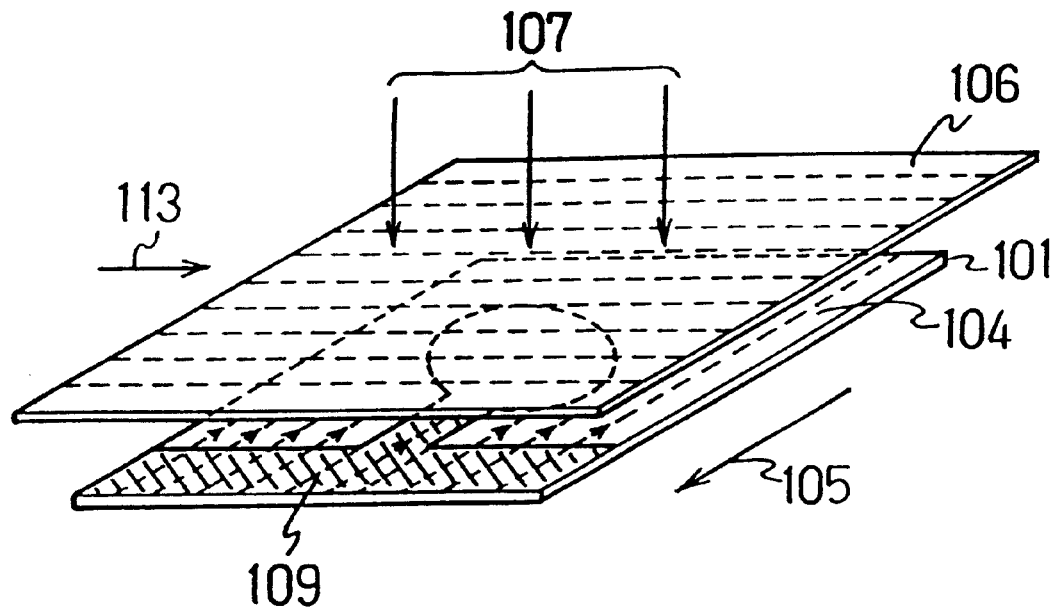
FIG. 26 is a schematic view of an exposure process performed for realigning adsorbed molecules by light exposure in Example 12 of the present invention.
Figure 27:
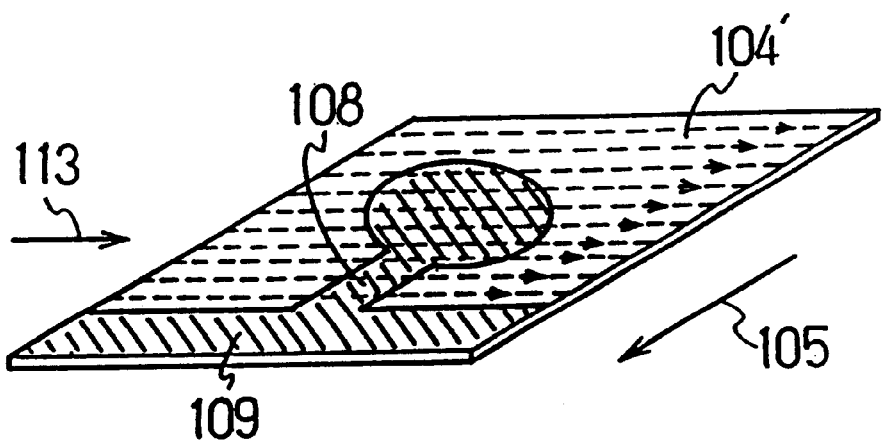
FIG. 27 is a schematic view for illustrating a molecular orientation state in a monomolecular liquid crystal alignment film after alignment with light in Example 12 of the present invention.
Figure 28:
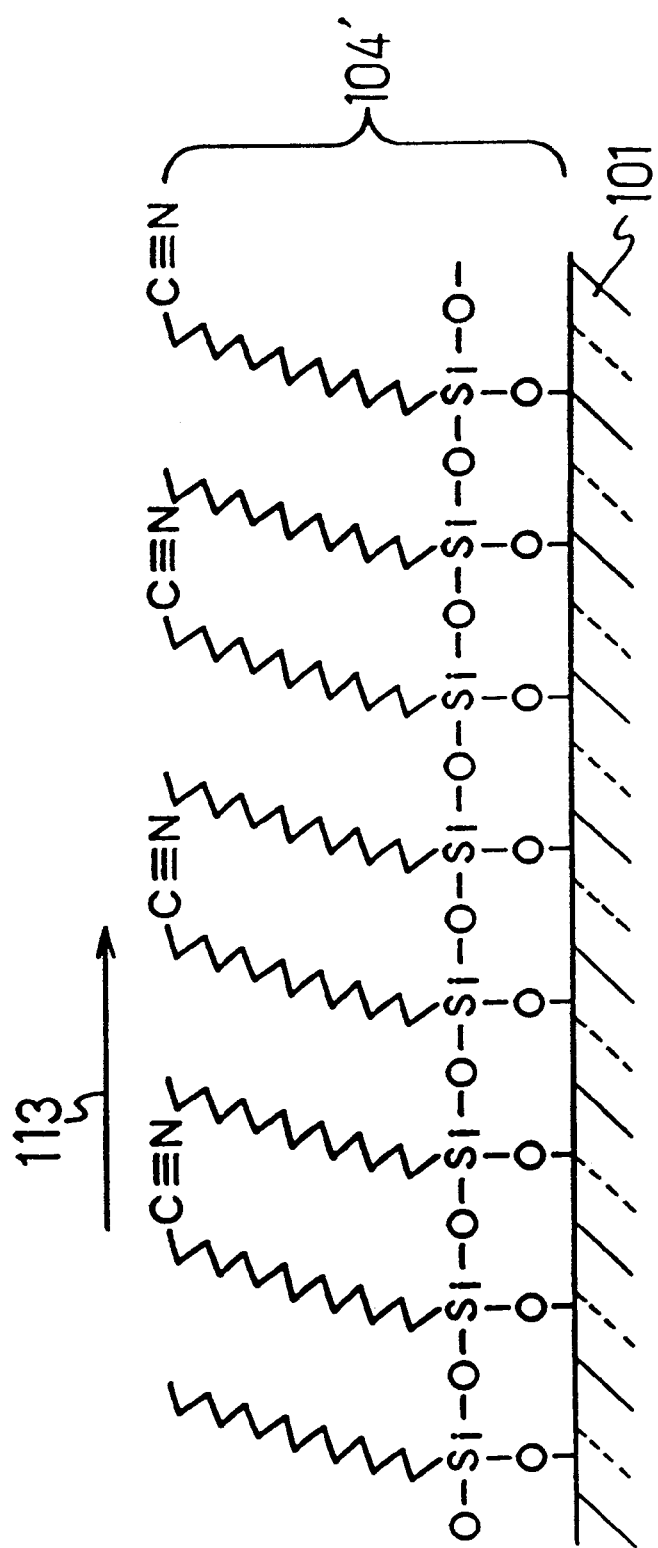
FIG. 28 is a schematic view of the a cross section enlarged to a molecular level for illustrating a molecular orientation state of a monomolecular chemisorption film after alignment with light in Example 12 of the present invention.

At this time, in order to align the orientations of the adsorbed molecules uniformly in one direction, it is necessary to deviate the polarizing direction by some degrees, preferably several degrees or more from 90°, rather than allowing the polarizing direction to intersect the lifting direction exactly by 90°. In this case, at the maximum, the polarizing direction 113 may be parallel to the direction in which the solution had been drained off. If they intersect each other exactly by 90°, the molecules may be oriented in two directions (FIG. 26). Thereafter, when the orientation of the linear carbon chains in the monomolecular chemisorption film 104' was examined, the tilt angle and the critical surface energy remained unchanged, but the orientation 108 was changed to a direction substantially parallel to the polarizing direction 113. In addition, the non-uniformity of the orientation was alleviated compared with that at the first alignment (FIGS. 27 and 28). In the Figure, reference numeral 109 denotes transparent electrodes.

In order to change the orientation selectively, a process in which a desired mask was disposed on the polarizing plate, and then exposure was performed was repeated a plurality of times. Thus, a monomolecular liquid crystal alignment film having different alignment directions in a pattern was produced easily.

In this example, as a solvent containing no water for washing, a hydrocarbon based n-hexane containing an alkyl group was used, but any other solvent can be used, as long as it contains no water and dissolves a surfactant. Other examples include a solvent containing a carbon fluoride group, a carbon chloride group or a siloxane group, such as Freon 113, chloroform, hexamethyldisiloxane or the like.

EXAMPLE 13

Before the process of chemisorption of the surfactant molecules comprising carbon chains and siloxane bond chains in Example 12, an adsorption solution was prepared by dissolving a compound containing a plurality of chlorosilyl groups, and the substrate was immersed in the adsorption solution in a dry atmosphere. Then, a dehydrochlorination reaction was effected between hydroxyl groups contained on the surface of the substrate and the chlorosilyl groups of the compound containing a plurality of chlorosilyl groups. Thereafter, when a reaction with water was allowed to be effected, the remaining chlorosilyl groups changed to hydroxyl groups, so that a chemisorption film comprising a large number of hydroxyl groups on its surface was formed.

For example, $SiCl_4$ was used as the silyl compound containing a plurality of chloro groups, and dissolved in n-octane so as to prepare an adsorption solution. Then, the substrate was immersed in the adsorption solution in a dry atmosphere. As a result, since —OH groups were present on the surface, a dehydrochlorination reaction was effected at the interface so as to form (formula 28) and/or (formula 29). Thus, chlorosilane molecules 111 were fixed to the surface of the substrate via —SiO— bonds.

(formula 28)

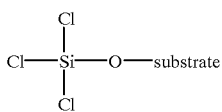

(formula 29)

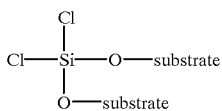

Figure 29:
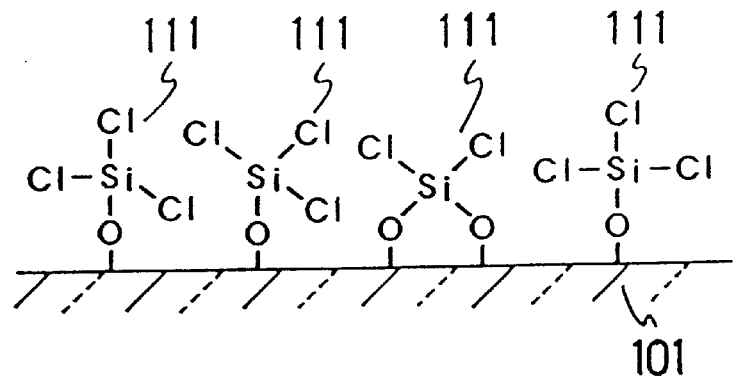
FIG. 29 is a schematic cross-sectional view enlarged to a molecular level for illustrating a state (before a reaction with moisture in the air) where a chlorosilane monomolecular film is formed in Example 13 of the present invention.
Figure 30:
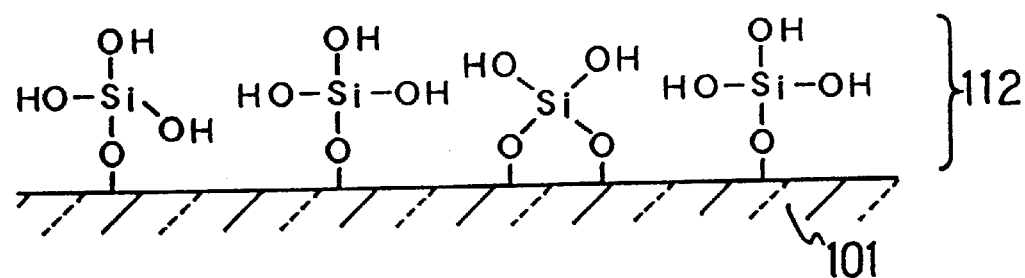
FIG. 30 is a schematic cross-sectional view enlarged to a molecular level for illustrating a state where a siloxane monomolecular film is formed in Example 13 of the present invention.

Thereafter, when the substrate was washed with a nonaqueous solvent such as chloroform, extra $SiCl_4$ molecules that had not reacted with the substrate were removed (FIG. 29). Furthermore, the substrate was taken out in the air so as to react with water. Then, a siloxane monomolecular adsorption film 112 containing a large number of SiO bonds represented by (formula 30) and/or (formula 31) was obtained on the surface (FIG. 30).

(formula 30)

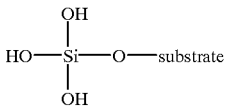

(formula 31)

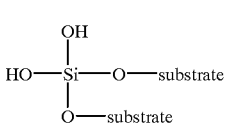

When the process of washing with a nonaqueous solvent such as chloroform was omitted, a polysiloxane chemisorption film (silica film) was formed.

Furthermore, since the thus obtained siloxane monomolecular film 112 was firmly bonded to the substrate via chemical bonds of —SiO—, it was not peeled off. Furthermore, the obtained monomolecular film has a large number of SiOH bonds on its surface. The SiOH bonds were generated in a number about twice or three times the original number of —OH groups. The treated portion in this state was highly hydrophilic. Then, in this state, when the chemisorption process was performed by using the same surfactant as in Example 12, the same monomolecular chemisorption film comprising carbon chains obtained as a result of the reaction of the surfactant as in FIG. 25 was formed in a thickness of about 1.5 nm by being chemically bonded through covalent bonds of siloxane via the siloxane monomolecular film 112. At this time, since the adsorption sites (OH groups in this case) on the surface of the substrate before adsorption were about twice or three times as many as that in Example 12, the density of the adsorbed molecules was higher than that of Example 12. The treated portion became lipophilic. The molecules of the chemisorption film in this case, although having a different molecular density, were aligned in the direction opposite to the lifting direction, namely the direction in which the solution had been drained off.

Next, a substrate in this state was used, and a polarizing plate was disposed on the substrate so that the polarizing direction was substantially orthogonal to the lifting direction. Then, a KrF excimer laser of 248 nm was radiated at 80 mJ/cm$^2$. Thereafter, when the orientation of the linear carbon chains in the monomolecular chemisorption film was examined, the tilt angle was 87°, which was slightly larger, and the orientation was changed to a direction substantially orthogonal to the lifting direction. In addition, nonuniformity of the orientation was alleviated. The critical surface energy at this time was 28 mN/m.

Then, two substrates in this state were set so that the chemisorption films were facing each other, so as to assemble a liquid crystal cell having a 20 micron gap so that an anti-parallel orientation was obtained. Thereafter, nematic liquid crystal (ZLI4792 manufactured by Merck & Co., Inc.) was injected. When the orientation state was observed, it was confirmed that the injected liquid crystal molecules were aligned along the chemically adsorbed molecules and substantially at a pre-tilt angle of about 46° with respect to the substrate.

As the silyl compounds containing a plurality of chloro groups, compounds other than $SiCl_4$ such as Cl—$(SiCl_2O)_2$—$SiCl_3$, or $SiHCl_3$, $SiH_2Cl_2$, or Cl—$(SiCl_2O)_n$—$SiCl_3$ (n is an integer) were usable.

EXAMPLE 14

In the case where $ClSi(CH_3)_2OSi(CH_3)_2OSi(CH_3)_2OSi(CH_3)_2Cl$ and $CH_3(CH_2)_{14}SiCl_3$ were mixed in the range from 1:0 to 0:1 and used as the chemisorption substance in place of $CH_3(CH_2)_{14}SiCl_3$ and $NC(CH_3)_2(CH_2)_{14}SiCl_3$ in Example 12, the critical surface energy was controlled in the range from 35 mN/m to 21 mN/m in accordance with the mixing ratio. When a cell was assembled and the same liquid crystal was injected, the pre-tilt angle was controlled in the range from 5° to 90°.

Furthermore, when $ClSi(CH_3)_2OSi(CH_3)_2OSi(CH_3)_2OSi(CH_3)_2Cl$ comprising a linear siloxane bond chain was mixed with $CH_3(CH_2)_{14}SiCl_3$ comprising a linear hydrocarbon chain at a desired ratio so as to form a film, a monomolecular chemisorption film comprising the molecules represented by (formula 32) and (formula 33) below, depending on the mixing ratio, was obtained.

(formula 32)

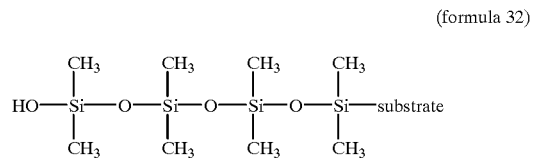

(formula 33)

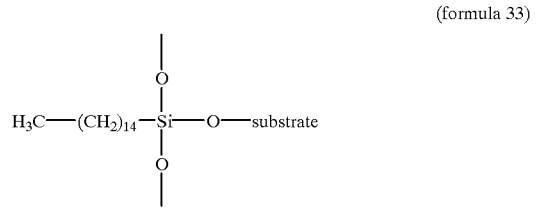

EXAMPLE 15

In place of $CH_3(CH_2)_{14}SiCl_3$ and $NC(CH_3)_2(CH_2)_{14}SiCl_3$ in Example 12, $HOOC(CH_2)_{16}Si(OCH_3)_3$ and $Br(CH_2)_8Si(OCH_3)_3$ were mixed in the range from 1:0 to 0:1 and used as the chemisorption substance, and reflux was performed at 100° C. for two hours during chemisorption. In this case, the critical surface energy was controlled in the range from 56 mN/m to 31 mN/m in accordance with the mixing ratio. Furthermore, when a cell was assembled and the same liquid crystal was injected, the pre-tilt angle was controlled in the range from 0° to 28°.

EXAMPLE 16

In place of $CH_3(CH_2)_{14}SiCl$, and $NC(CH_3)_2(CH_2)_{14}SiCl_3$ in Example 12, $CH_3CH_2C^*HCH_3CH_2OCO(CH_2)_{10}SiCl_3$ (wherein C* is an asymmetric carbon) and $CH_3SiCl$ were mixed in the range from 1:0 to 1:20 and used as the chemisorption substance so as to produce the same alignment film. In this case, the critical surface energy was controlled in the range from 36 mN/m to 41 mN/m in accordance with the mixing ratio. Furthermore, when a cell was assembled and the same liquid crystal was injected, the pre-tilt angle was controlled in the range from 3° to 0.1°.

EXAMPLE 17

Next, a production process in actually producing a liquid crystal display device by using the above-described liquid crystal alignment film will be described with reference to FIG. 31.

Figure 31:
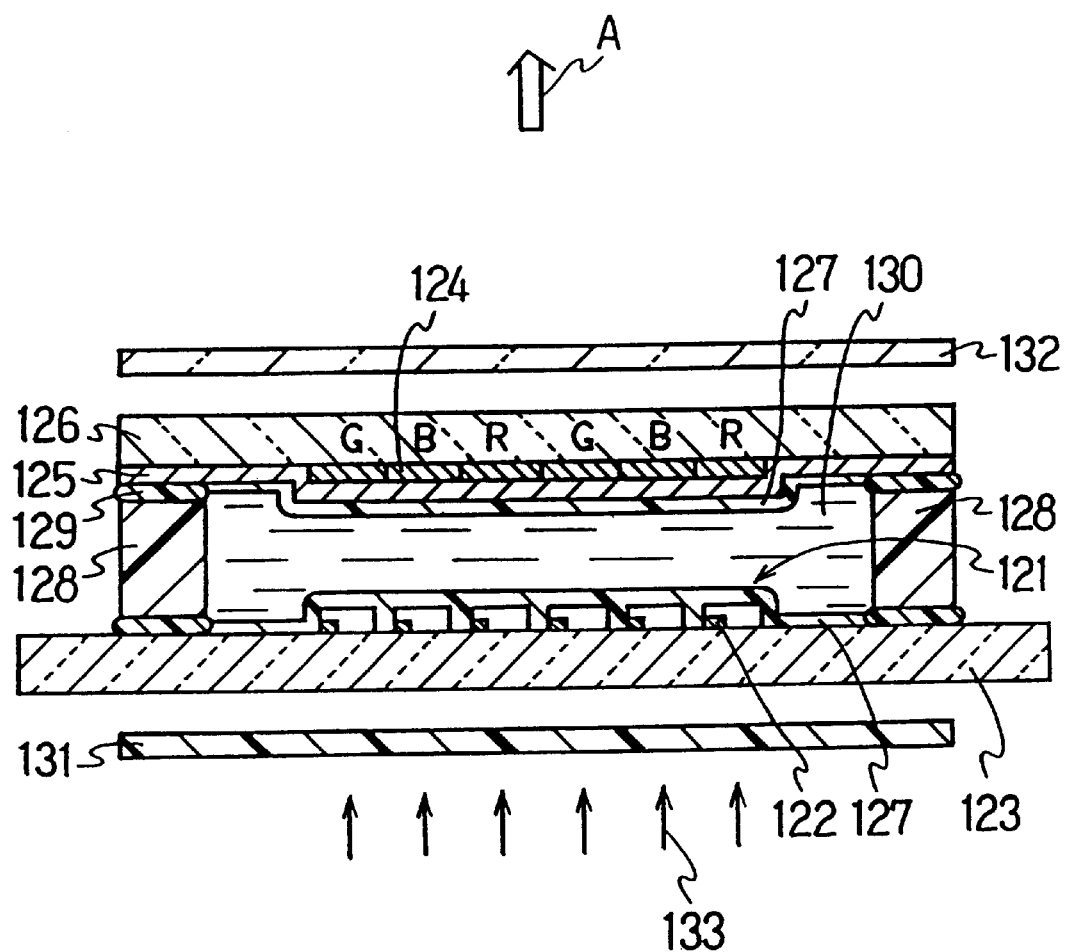
FIG. 31 is a schematic cross-sectional view for illustrating production of a liquid crystal display apparatus in Example 14 of the present invention.

First, as shown in FIG. 31, a first substrate 123 includes first electrode arrays 121 mounted in a matrix and transistor arrays 122 for driving the electrodes. A second substrate 126 includes color filter arrays 124 and second electrodes 125 opposed to the first electrode arrays. According to the same procedures as in Example 16, a prepared chemisorption solution was applied onto the first substrate and the second substrate so as to form a monomolecular chemisorption film having a critical surface energy of 36 mN/m.

Thereafter, a polarizing plate HNP'B (manufactured by POLAROID) was used and disposed so that the polarizing direction was parallel to the electrode pattern. Then, light having a wavelength of 365 nm (i rays) (at 3.6 mJ/cm² after passing through the polarizing plate) was radiated at 500 W by using an extra-high pressure mercury lamp from the vertical direction for 20 seconds. As a result, a liquid crystal alignment film 127 having a critical surface energy of 37 mN/m in which linear hydrocarbon groups were realigned along the electrode pattern was produced as in Example 16. Next, the first and the second substrates 123 and 126 were positioned so that the respective electrodes were opposed, and fixed with spacers 128 and an adhesive 129 with about a 5 micron gap. Thereafter, the TN liquid crystal 130 was injected between the first and the second substrates, and polarizing plates 131 and 132 were provided. Thus, a display device was completed. In this case, the pre-tilt angle of the injected liquid crystal was 3 degrees.

Such a device was able to display images in the direction shown by arrow A by being entirely irradiated with backlight 133 and by driving each transistor with video signals.

EXAMPLE 18

In the light realignment process in Example 17, when the process of disposing a patterned mask for dividing each pixel into four sections in a checkerboard pattern on the polarizing plate for exposure was carried out twice, four sections having different alignment directions in a pattern were obtained in one pixel. Thus, when the substrate provided with this alignment film was used, the viewing angle of the liquid crystal display apparatus was significantly improved.

In Examples 12 through 18, light of 365 nm, which is i rays, from an extra-high pressure mercury lamp or light of 248 nm obtainable from a KrF excimer laser was used as light for exposure. However, light of 436 nm, 405 nm or 254 nm can be used, depending on the degree of absorption of light by a film substance. In particular, light of 248 nm or 254 nm provides a high alignment efficiency because it is absorbed by most substances readily.

Furthermore, in the above-described example, as the silane-based surfactant comprising a linear hydrocarbon group or a siloxane bond chain and a chorosilyl group, or an alkoxysilyl group or an isocyanate silyl group, a chlorosilane-based surfactant comprising a cyano group on one end of its molecule and a chlorosilyl group at the other end was mixed with a chlorosilane-based surfactant comprising a methyl group and a chlorosilyl group. In order words, two types of chlorosilane surfactants having different surface energies were mixed and used. However, the present invention is not limited thereto. By combining various surfactants having different surface energies, various alignment films having different surface energies were produced. For example, a chlorosilane-based surfactant substituted with at least one organic group selected from the group consisting of a carbon trifluoride group ($—CF_3$), a methyl group ($—CH_3$), a vinyl group ($—CH=CH_2$), an allyl group ($—CH=CH_2—$), an acetylene group (triple bonds of carbon—carbon), a phenyl group ($—C_6H_5$), an aryl group ($—C_6H_4—$), a halogen atom, an alkoxy group (—OR; R represents an alkyl group, especially preferably an alkyl group having one to three carbons), a cyano group (—CN), an amino group (—NH), a hydroxyl group (—OH), a carbonyl group (=CO), an ester group (—COO—) and a carboxyl group (—COOH), or a hydrocarbon group having an optical activity at the terminal of its hydrocarbon group, as shown below, was usable.

Furthermore, a chlorosilane-based surfactant represented by $Ha(CH_2)_nSiCl_3$ (Ha represents a halogen atom such as chlorine, bromine, iodine, fluorine, or the like, and n is an integer, preferably of 1 to 24) can be used. Moreover, the following compounds can be used.

(1) $CH_3(CH_2)_nSiCl_3$ (n is an integer, preferably of 0 to 24.)
(2) $CH_3(CH_2)_pSi(CH_3)_2(CH_2)_qSiCl_3$ (p and q are integers, preferably of 0 to 10.)
(3) $CH_3COO(CH_2)_mSiCl_3$ (m is an integer, preferably of 7 to 24.)
(4) $C_6H_5(CH_2)_nSiCl_3$ (n is an integer, preferably of 0 to 24.)
(5) $CN(CH_2)_nSiCl_3$ (n is an integer, preferably of 0 to 24.)
(6) $Cl_3Si(CH_2)_nSiCl_3$ (n is an integer, preferably of 3 to 24.)
(7) $Cl_3Si(CH_2)_2(CF_2)_n(CH_2)_2SiCl_3$ (n is an integer, preferably of 1 to 10.)

Furthermore, in addition to the chlorosilane-based surfactant, silane-based surfactants comprising an alkoxysilyl group or an isocyanate silyl group as shown below were usable.

(8) $Ha(CH_2)_nSi(OCH_3)_3$ (Ha represents a halogen atom such as chlorine, bromine, iodine, fluorine, or the like, and n is an integer, preferably of 1 to 24.)
(9) $CH_3(CH_2)_nSi(NCO)_3$ (n is an integer, preferably of 0 to 24.)
(10) $CH_3(CH_2)_pSi(CH_3)_2(CH_2)_qSi(OCH_3)_3$ (p and q are integers, preferably of 0 to 10.)
(11) $HOOC(CH_2)_mSi(OCH_3)_3$ (m is an integer, preferably of 7 to 24.)
(12) $H_2N(CH_2)_mSi(OCH_3)_3$ (m is an integer, preferably of 7 to 24.)
(13) $C_6H_5(CH_2)_nSi(NCO)_3$ (n is an integer, preferably of 0 to 24.)
(14) $CN(CH_2)_nSi(OC_2H_5)_3$ (n is an integer, preferably of 0 to 24.)

More specifically, the following compounds can be used.
(1) $Br(CH_2)_8SiCl_3$
(2) $CH_2=CH(CH_2)_{17}SiCl_3$
(3) $CH_3(CH_2)_8—CO—(CH_2)_{10}SiCl_3$
(4) $CH_3(CHO_5—COO—(CH_2)l_0SiCl_3$
(5) $CH_3(CH_2)_8—Si(CH_3)_2—(CH_2)_{10}SiCl_3$ (6) $CH_3(CH_2)_{17}SiCl_3$
(7) $CH_3(CH_2)_5Si(CH_3)_2(CH_2)_8SiCl_3$
(8) $CH_3COO(CH_2)_{14}SiCl_3$
(9) $C_{65}(CH_2)_8SiCl_3$
(10) $CN(CH_2)_{14}SiCl_3$
(11) $Cl_3Si(CH_2)_8SiCl_3$
(12) $Cl_3Si(CH_2)_2(CF_2)_4(CH_2)_2SiCl_3$
(13) $Cl_3Si(CH_2)_2(CF_2)_6(CH_2)_2SiCl_3$
(14) $CF_3CF_2(CF_2)_7(CH_2)_2SiCl_3$
(15) $(CF_3)_2CHO(CH_2)_{15}Si(CH_3)_2Cl$
(16) $CF_3CF_2(CH_2)_2Si(CH_3)_2(CH_2)_{15}SiCl_3$
(17) $CF_3(CF_2)_4(CH_2)_2Si(CH_3)_2(CH_2)_9SiCl_3$
(18) $CF_3(CF_2)_7(CH_2)_2Si(CH_3)_2(CH_2)_9SiCl_3$
(19) $CF_3COO(CH_2)_{15}SiCH_3Cl_2$
(20) $CF_3(CF_2)_5(CH_2)_2SiCl_3$
(21) $CH_3CH_2CHC*H_3CH_2OCO(CH_2)_{10}SiCl_3$ (C* represents an optically active asymmetric carbon.)
(22) $CH_3CH_2CHC*H_3CH_2OCOC_6H_4OCOC_6H_4O(CH_2)_5SiCl_3$
(23) a compound represented by (formula 34) below

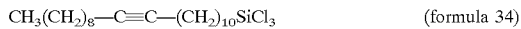   (formula 34)

(24) a compound represented by (formula 35) below

   (formula 35)

Furthermore, the following compounds comprising a siloxane bond chain and a chlorosilyl group, or an alkoxysilane group or an isocyanate silyl group were usable. In this case as well, a film having a high alignment was obtained.
(25) $ClSi(CH_3)_2OSi(CH_3)_2OSi(CH_3)_2OSi(CH_3)_2Cl$
(26) $Cl_3SiOSi(CH_3)_2OSi(CH_3)_2OSi(CH_3)_2OSi(CH_3)_2OSiCl_3$

EXAMPLE 19

Hereinafter, a fourth liquid crystal alignment film of the present invention will be described in detail with reference to the accompanying drawings.

FIGS. 32(a) to (d) are cross-sectional views showing a production process of a fourth liquid crystal alignment film of the present invention. Hereinafter, the present example will be described according to FIGS. 32(a) to (d).

First, 4' methacryloyloxy chalcone (4' MC) and glycidyl methacrylate (GMA) were copolymerized at a mole ratio of 1:4 so as to prepare a resin transparent in a visible light range as shown in (formula 1), where a photosensitive benzalacetophenone group and a thermocrosslinking glycidyl group and methyl group were introduced as side chain groups (i.e., a resin having an energy beam sensitive group and a thermoreactive group) beforehand. Then, the resin was diluted to 0.5% in cyclohexanone so as to prepare a sensitizing solution.

Figure 32:
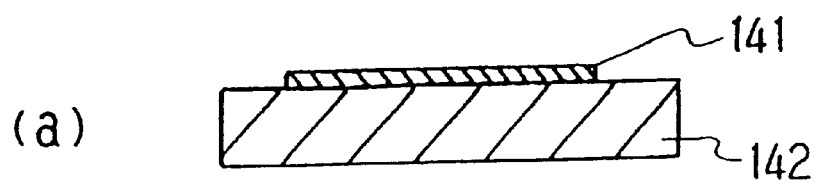
FIG. 32 is a cross-sectional view showing processes for producing a liquid crystal alignment film in Example 18 of the present invention.
Figure 32:
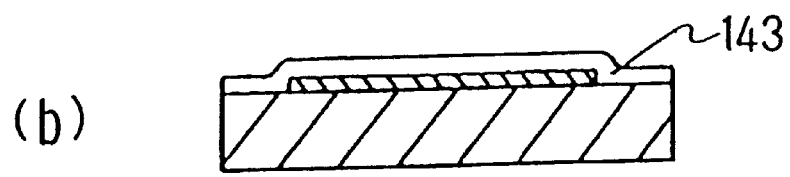
Figure 32:
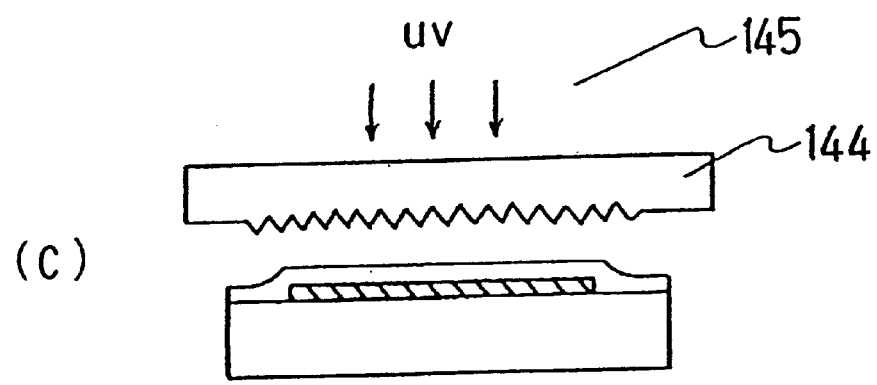
Figure 32:
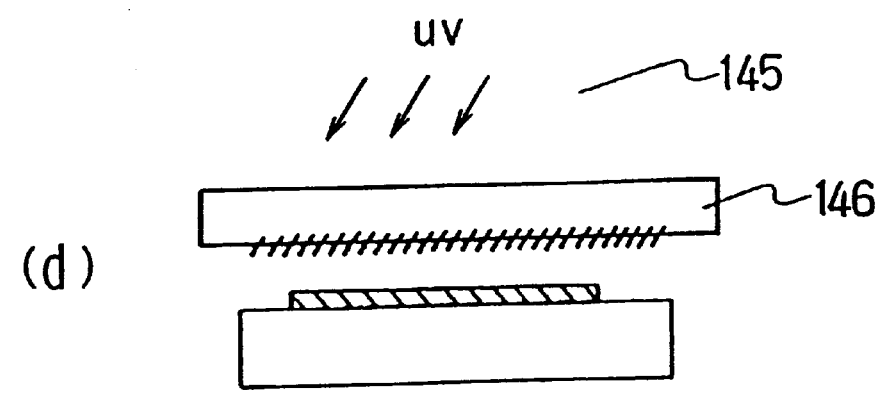

Next, the sensitizing solution was applied directly (or indirectly via a insulating thin film such as $SiO_2$ or the like) to a predetermined portion on the surface of a glass substrate 142 previously provided with transparent electrodes 141 formed of ITO, as shown in FIG. 32(a), by using a dipping method (or a rolling coater or flexography). Thus, as shown in FIG. 32(b), a photosensitive and thermosetting film 143 was formed.

Thereafter, the film was heated at 100° C. for 10 minutes so as to remove most of the solvent (the thickness at this time was about 300 nm). Next, as shown in FIG. 32(c), a diffraction grating 144 of 1000 slits/mm was used as a mask (a polarizing plate can be used, where it is necessary to prolong an exposure time because the transmittance is poor), and disposed so that it was parallel to the electrode pattern. Then, as energy beams, ultraviolet rays 145 having a wavelength of 365 nm (i rays) (at 28 mJ/cm² after passing through the mask) were radiated from the vertical direction at 500 W by using an extra-high pressure mercury lamp for 5 seconds, so as to react and crosslink the photosensitive benzalacetophenone group. As a result, convexities and concavities of about 30 to 40 nm were formed on the surface of the film along the diffraction grating at a pitch of 1000 slits/mm.

Figure 33:
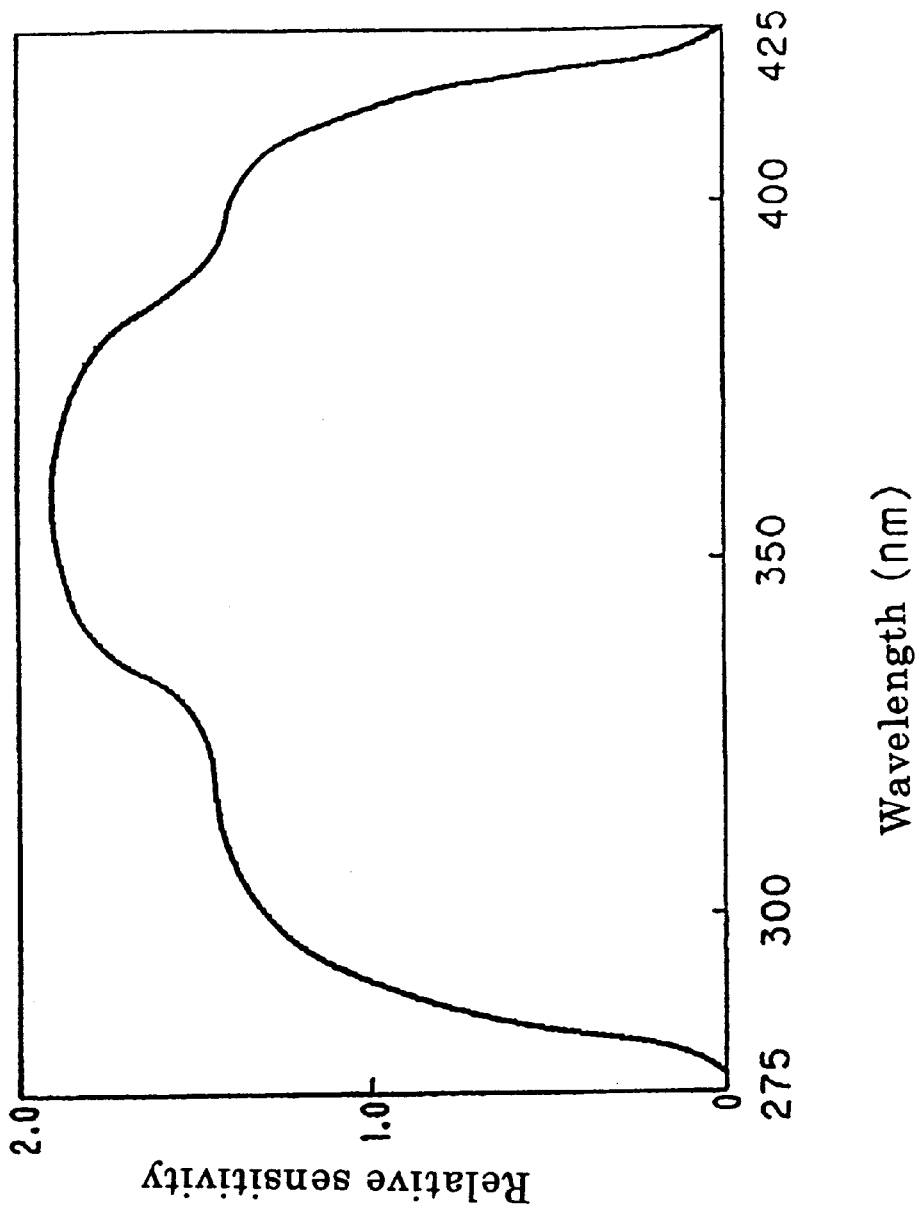
FIG. 33 is a view showing spectral sensitivity characteristics of a photosensitive and thermosetting resin in a liquid crystal alignment film in Example 18 of the present invention.

FIG. 33 shows the spectral sensitivity characteristics of the photosensitive film.

In this state, a liquid crystal cell was assembled with a 20 micron gap. Then, nematic liquid crystal (ZLI4792 manufactured by Merck & Co., Inc.) was injected. When the orientation state was observed, it was confirmed that the liquid crystal was aligned in a direction orthogonal to the diffraction grating pattern. Furthermore, it was confirmed that the pre-tilt angle of the injected liquid crystal was controlled by the exposure amount.

On the other hand, in the exposure process, after performing exposure for 3 seconds by using the diffraction grating, a commercially available polarizing plate 146 for UV rays (HNP'B manufactured by POLAROID) was further used as a mask, and disposed so that the polarizing direction was perpendicular to the diffraction grating pattern and that the incidence angle was 45° with respect to the substrate. Then, as energy beams, ultraviolet rays having a wavelength of 365 nm (i rays) (at 3 mJ/cm² after passing through the mask) was radiated at 500 W by using an extra-high pressure mercury lamp for 40 seconds (FIG. 32(d)), so as to further react and crosslink the remaining unreacted energy beam sensitive groups.

In this state, a liquid crystal cell was assembled, and nematic liquid crystal was injected. When the orientation state was observed, it was confirmed that the liquid crystal was aligned in the direction of the grating pattern, and that the pre-tilt angle was about 20°. It was also confirmed in this second irradiation that it was possible to control the pre-tilt angle of the injected liquid crystal by changing the irradiation angle. The alignment films produced by the above-described two processes without no further treatment were usable as alignment films, but when a heat treatment was performed at about 150° C., the alignment property of the alignment films deteriorated.

Therefore, in order to further improve the thermal stability of the alignment film, the alignment film was heated at 180° C. for 10 minutes, so as to open and crosslink the thermoreactive glycidyl groups (i.e., thermosetting groups). In this state, a liquid crystal cell was assembled, and nematic liquid crystal was injected. When the orientation state was observed, it was confirmed that the liquid crystal was aligned in a direction perpendicular to the grating pattern, and that the pre-tilt angle was about 7°. Furthermore, the thermal stability of the alignment film was improved to 170° C.

The reaction by exposure of the photosensitive and thermosetting film and the reaction by heating are both crosslinking reactions, as shown by (formula 36) below.

(formula 36)
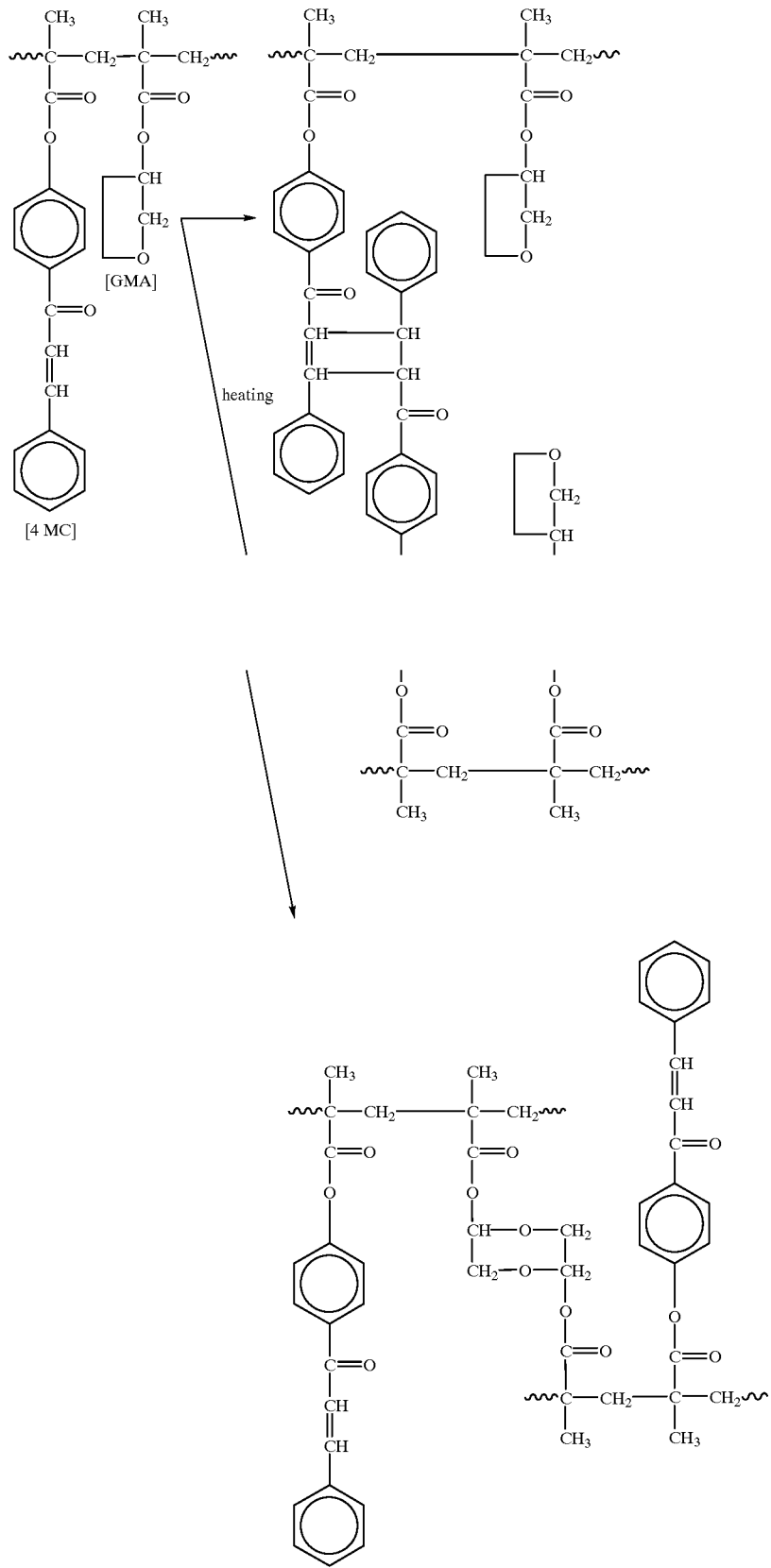

Furthermore, a substance containing no hydrocarbon group (—CH$_3$) was synthesized and the same experiment was performed. As a result, the alignment controllability, especially the control stability of the pre-tilt angle, of the liquid crystal was worse than one containing —CH$_3$.

As described above, for the film in this example, the energy beam sensitive group was a photosensitive group, and light was radiated through a mask to react the photosensitive groups in the film so as not only to crosslink the principal chains but also to fix and align side chain groups. Furthermore, since the film was sensitive to i rays (see FIG. 33), it was possible to use an ordinary exposure apparatus, thereby simplifying the production process of the liquid crystal alignment film.

Furthermore, when the resin film is exposed to light through a polarizing film and a diffraction grating as a mask, a liquid crystal alignment film having striped convexities and concavities was produced on the surface of the film easily.

At this time, by changing light exposure, or by performing exposure obliquely through a polarizing film and a diffraction grating, or by performing exposure obliquely through a polarizing film and then performing exposure through a diffraction grating, or by performing exposure through a diffraction grating and then performing exposure obliquely through a polarizing film, the pre-tilt angle of interposed liquid crystal was controlled. Thus, a liquid crystal alignment film having a stable alignment property was produced. In order to stabilize the pre-tilt angle by one exposure, it was important to expose the photosensitive film to light to an extent that predetermined convexities and concavities are generated on the surface thereof.

Furthermore, when heat is applied so as to react thermoreactive groups before or after radiating energy beams so as to react and crosslink the energy beam sensitive groups, the heat resistance of the alignment of the alignment film was improved. Electron beams, X rays, or ultraviolet rays are usable as the energy beams, but ultraviolet rays provided a higher practicability in an actual production process.

As described above, a resin film transparent in a visible light range and having energy beam sensitive groups and thermoreactive groups was formed directly on electrodes or indirectly via an arbitrary thin film, and a rubbing free liquid crystal alignment film formed of a film obtained by at least reacting the energy beam sensitive groups was produced by a remarkably simple method.

EXAMPLE 20

Figure 34:
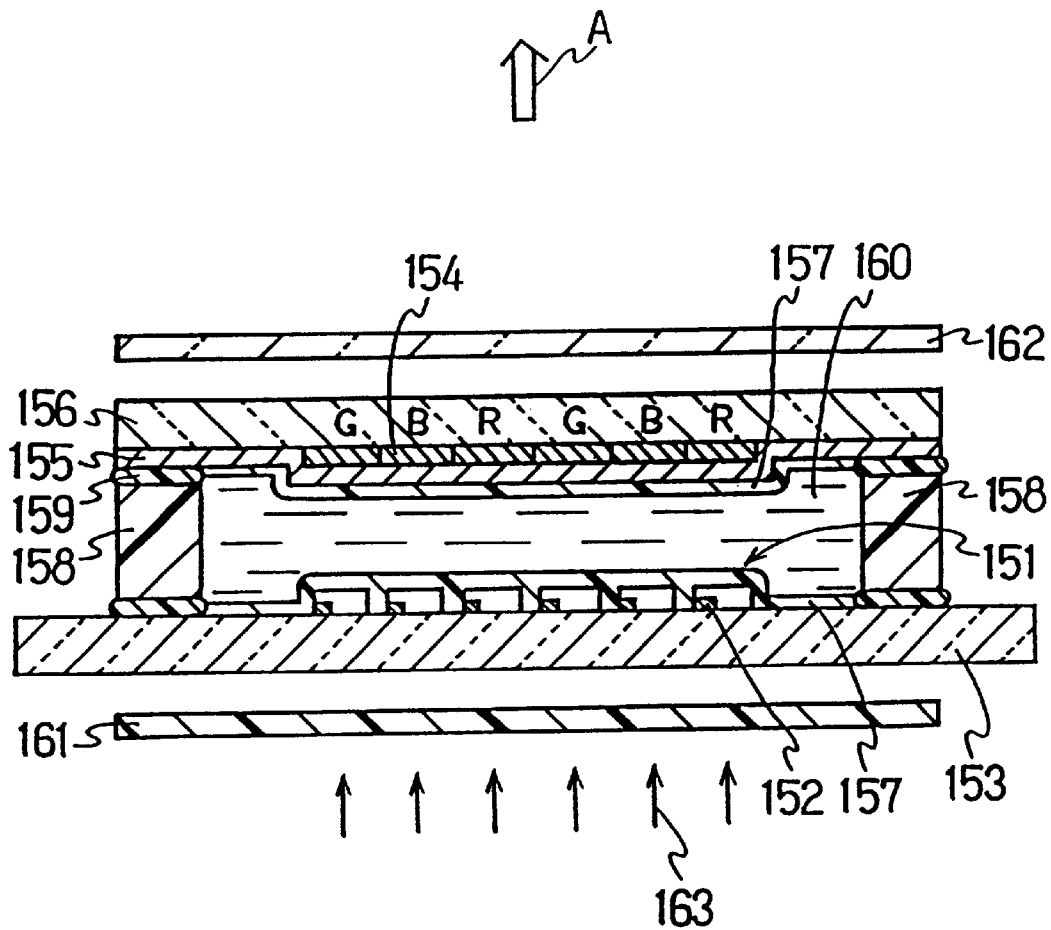
FIG. 34 is a cross-sectional view of a liquid crystal display device in Example 19 of the present invention.

Next, a liquid crystal display device using the above-described alignment film and a production method thereof will be described in detail with reference to FIG. 34.

First, a resin transparent in a visible light range and having energy beam sensitive groups and thermoreactive groups as represented by (formula 1) was diluted in cyclohexanone to 0.5% so as to prepare a sensitizing solution beforehand. Then, as shown in FIG. 34, a first substrate 153 includes first electrode arrays 151 mounted in a matrix and transistor arrays 152 for driving the electrodes. A second substrate 156 includes color filter arrays 154 and second electrodes 155 opposed to the first electrode arrays. The sensitizing solution was applied onto the first substrate and the second substrate by a dipping method, so as to form a photosensitive and thermosetting resin film.

Thereafter, the film was heated at 100° C. for 10 minutes so as to remove the solvent to some extent. Then, using a diffraction grating of 1000 slits per mm as a mask, and disposing the grating parallel to the electrode pattern, ultraviolet rays having a wavelength of 365 nm (i rays) (at 28 mJ/cm$^2$ after passing through the mask) was radiated at 500 W by using an extra-high pressure mercury lamp from the vertical direction for 5 seconds, so as to react and crosslink benzalacetophenone groups, which are the energy beam sensitive groups. Then, a liquid crystal alignment film 157 provided with concavities and convexities of about 30 to 40 nm was produced.

Next, the first and the second substrates 153 and 156 were positioned so that they were opposed to each other, and fixed with spacers 158 and an adhesive 159 with about a 5 micron gap. Thereafter, the liquid crystal 160 was injected between the first and the second substrates, and polarizing plates 161 and 162 were provided. Thus, a display device was completed. Such a device was able to display images in the direction shown by arrow A by being entirely irradiated with backlight 163 and by driving each transistor with video signals.

INDUSTRIAL APPLICABILITY

As described above, the first liquid crystal alignment film of the present invention has an effect of producing a uniform and thin alignment film in a desired pattern efficiently without performing rubbing.

Furthermore, in producing the liquid crystal alignment film, by repeating the process using the method of chemically adsorbing a silane surfactant to the surfaces of the electrodes along the exposure pattern to form one layer of a monomolecular film several times, a liquid crystal alignment film having a multi-domain where a plurality of orientations are present in each pixel can be produced easily.

Furthermore, the use of such a liquid crystal alignment film eliminates a chance of generating defects as generated in a conventional rubbing process, and provides a liquid crystal display apparatus having a remarkably high yield, a low cost and high reliability and being capable of displaying at a wide viewing angle.

Furthermore, a specific liquid crystal, for example nematic liquid crystal or ferroelectric liquid crystal, can be incorporated into the bonds in the alignment film formed by adsorption, so that it provides an excellent alignment controllability.

As described above, the second liquid crystal alignment film of the present invention has an effect of efficiently and rationally producing an alignment film having a function of controlling the pre-tilt angle of liquid crystal and aligning liquid crystal in an arbitrary direction by controlling the critical surface energy of the alignment film without using rubbing as conventionally performed.

Furthermore, the method for producing the liquid crystal alignment film of the present invention efficiently provides an alignment film having an excellent adhesion strength where the molecules constituting the film are aligned uniformly in a specific direction and bonded to the surface of the substrate at one end.

Furthermore, at the time of producing the liquid crystal alignment film, if the process of exposure through a patterned mask disposed on a polarizing plate is performed a plurality of times, a plurality of portions each having a different patterned orientation can be formed on one face of the alignment film. This makes it possible to easily produce a liquid crystal display apparatus having a multi-domain where a plurality of orientations are present in each pixel, which was difficult with conventional rubbing.

Furthermore, the use of such a liquid crystal alignment film eliminates a chance of generating defects as generated in a conventional rubbing process, and provides a liquid crystal display apparatus having a remarkably high yield, a low cost and high reliability and being capable of displaying at a wide viewing angle.

Furthermore, a specific liquid crystal, for example nematic liquid crystal or ferroelectric liquid crystal, can be incorporated into the bonds in the alignment film formed by adsorption, so that it provides an excellent alignment controllability.

As described above, the third liquid crystal alignment film of the present invention has an effect of efficiently producing a uniform and thin alignment film having a function of controlling the pre-tilt angle of liquid crystal and aligning liquid crystal in an arbitrary direction without using rubbing as conventionally performed.

Furthermore, at the time of producing the liquid crystal alignment film, if the process of exposure through a patterned mask disposed on a polarizing plate is performed a plurality of times, a plurality of portions, each having a different patterned orientation, can be formed on one face of the alignment film. This makes it possible to efficiently produce a liquid crystal display apparatus having a multi-domain where a plurality of orientations are present in each pixel, which was difficult with conventional rubbing.

Furthermore, the use of such a liquid crystal alignment film eliminates a chance of generating defects as generated in a conventional rubbing process, and provides a desired pre-tilt angle and a liquid crystal display apparatus having a remarkably high yield, a low cost and high reliability and being capable of displaying at a wide viewing angle.

Furthermore, liquid crystal having a specific surface energy, for example nematic liquid crystal or ferroelectric liquid crystal, can be incorporated into the bonds in the alignment film formed by adsorption. Therefore, it is possible to efficiently produce an alignment film having not only the controllability of the orientation and the tilt angle, but also an excellent alignment regulation force.

As described above, the fourth liquid crystal alignment film of the present invention has an effect of producing a uniform and thin alignment film in a short time efficiently without performing conventional rubbing.

Furthermore, the use of such a liquid crystal alignment film provides a liquid crystal display apparatus having a remarkably high yield, a low cost and high reliability without performing conventional rubbing.

What is claimed is:

1. A liquid crystal alignment member suitable for use in a liquid crystal display, comprising:
    a substance having a first surface;
    a first resin film formed on the first surface of the substrate, said first resin film being formed from a material that is capable of generating a functional group containing active hydrogen by energy beam irradiation; and
    a liquid crystal alignment film of a silane-based surfactant comprising a plurality of linear carbon chains and Si, said surfactant being chemically absorbed on the substrate by means of the first resin film after the first resin film is irradiated with an energy beam so as to form the functional groups containing active hydrogen, the linear carbon chains being aligned in a specific direction,
    wherein the alignment film is exposed to light polarized via a polarizing plate after the linear carbon chains are aligned, further resulting in the linear carbon chains being aligned at a desired tilt.

2. The liquid crystal alignment member according to claim 1. wherein the film formed of the surfactant is fixed to the first resin film via covalent bonds on the surface of the substrate in an arbitrary pattern.

3. The liquid crystal alignment member according to claim 2, wherein the fixed film formed of the surfactant is fixed to the first resin film via a film having siloxane bonds.

4. The liquid crystal alignment film according to claim 1, wherein the silane-based surfactant is a chlorosilane-based surfactant containing a linear hydrocarbon group and a chlorosilyl group.

5. The liquid crystal alignment film according to claim 4, wherein a part of hydrogen of the linear hydrocarbon group of the chlorosilane-based surfactant is substituted with at least a fluorine atom.

6. The liquid crystal alignment film according to claim 4, wherein a plurality of types of chlorosilane-based surfactants, each having a different molecular length, are mixed and used as the chlorosilane-based surfactant containing a linear hydrocarbon group and a chlorosilyl group.

* * * * *